US012620330B2

(12) United States Patent
Mizusako

(10) Patent No.: US 12,620,330 B2
(45) Date of Patent: *May 5, 2026

(54) PROJECTION DISPLAY DEVICE

(71) Applicant: SEIKO EPSON CORPORATION, Tokyo (JP)

(72) Inventor: Kazuhisa Mizusako, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/931,955

(22) Filed: Oct. 30, 2024

(65) Prior Publication Data

US 2025/0140142 A1 May 1, 2025

(30) Foreign Application Priority Data

Oct. 31, 2023 (JP) ................................. 2023-186636

(51) Int. Cl.
*H04N 9/31* (2006.01)
*G09G 3/00* (2006.01)
*G09G 3/36* (2006.01)

(52) U.S. Cl.
CPC ........... *G09G 3/007* (2013.01); *G09G 3/3607* (2013.01); *G09G 3/3614* (2013.01); *H04N 9/3161* (2013.01); *H04N 9/3182* (2013.01); *G09G 2300/023* (2013.01); *G09G 2320/0271* (2013.01)

(58) Field of Classification Search
CPC ...... H04N 9/3161; H04N 9/3182; H04N 9/31;

G09G 3/007; G09G 3/3607; G09G 3/3614; G09G 2300/023; G09G 2310/06; G09G 2320/0242; G09G 2320/0271; G09G 2320/066
USPC ....... 348/744–747, 750, 751, 756, 757, 806, 348/807; 353/30, 31, 33, 69, 81, 89, 94, 353/99; 345/691
See application file for complete search history.

(56) References Cited

U.S. PATENT DOCUMENTS

| | | | |
|---|---|---|---|
| 5,337,171 | A | 8/1994 | Mase et al. |
| 2010/0128228 | A1 | 5/2010 | Matsuo et al. |
| 2010/0201952 | A1 | 8/2010 | Sakai |

(Continued)

FOREIGN PATENT DOCUMENTS

| | | |
|---|---|---|
| JP | 2002-244203 A | 8/2002 |
| JP | 2010-181670 A | 8/2010 |
| WO | 2020/057296 A1 | 3/2020 |

*Primary Examiner* — Sherrie Hsia
(74) *Attorney, Agent, or Firm* — Oliff PLC

(57) ABSTRACT

A projection display device including a first panel that generates a first image, a second panel that generates a second image, a prism that combines the first image with the second image shifted in a horizontal direction with respect to a first pixel and outputs a combination image, a light path shift element, and a display control circuit. The display control circuit supplies data signals of odd-numbered rows to the first panel and supplies data signals of even-numbered rows to the second panel in an odd-numbered field period, and supplies data signals of even-numbered rows to the first panel and supplies data signals of even-numbered rows to the second panel in an even-numbered field period, and controls the light path shift element so that a light path of the combination image is shifted in a vertical direction.

8 Claims, 12 Drawing Sheets

(56) References Cited

U.S. PATENT DOCUMENTS

| | | |
|---|---|---|
| 2012/0287098 A1 | 11/2012 | Ito |
| 2019/0116343 A1 | 4/2019 | Nakamura et al. |
| 2021/0076015 A1 | 3/2021 | Hosaka |
| 2021/0280107 A1* | 9/2021 | Hosaka .................. H04N 9/317 |
| 2022/0163829 A1* | 5/2022 | Wakabayashi ....... H04N 9/3188 |

\* cited by examiner

<VIDEO PIXEL>
| A1 | A2 | A3 | A4 |
| B1 | B2 | B3 | B4 |
| C1 | C2 | C3 | C4 |
| D1 | D2 | D3 | D4 |
FIG. 3
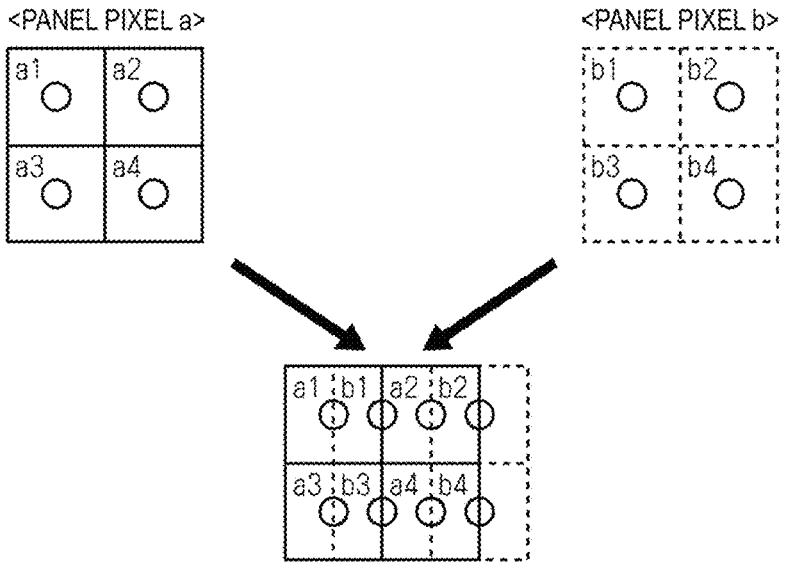
FIG. 4
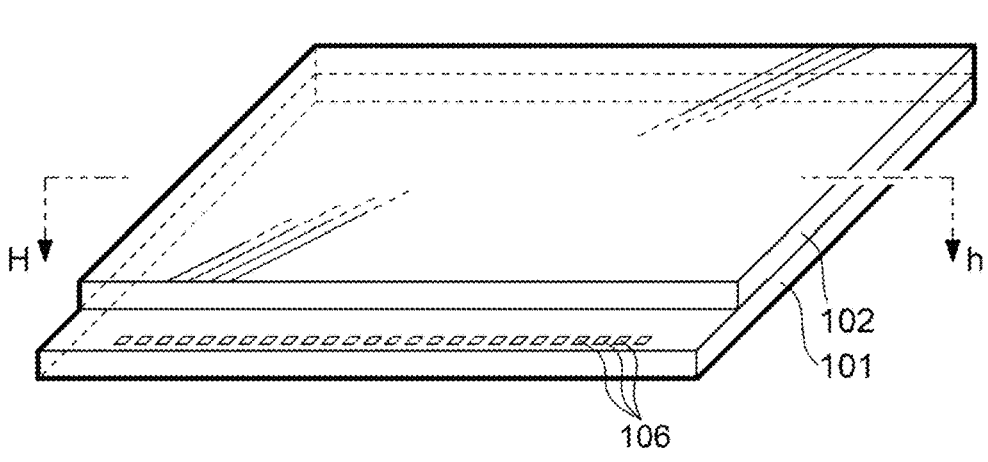
FIG. 5

Time ▶

Time ▶

PROJECTION DISPLAY DEVICE

The present application is based on, and claims priority from JP Application Serial Number 2023-186636, filed Oct. 31, 2023, the disclosure of which is hereby incorporated by reference herein in its entirety.

BACKGROUND

1. Technical Field

The present disclosure relates to a projection display device.

2. Related Art

In a projection display device that projects image light created by a liquid crystal panel or the like onto a screen or the like, a technology for shifting a first optical image generated by a first optical system and a second optical image generated by a second optical system, combining the optical images, and projecting a resultant image to achieve high resolution has been proposed (see, for example, JP-A-2010-181670).

Specifically, when color display is realized in the technology, the following configuration is used. That is, images from three liquid crystal panels are combined by a first dichroic prism so that a first optical image is obtained in the first optical system, images from three liquid crystal panels are combined by a second dichroic prism so that a second optical image is obtained in the second optical system, and the first optical image and the second optical image are combined by a prism.

However, in the technology, not only a total of six liquid crystal panels, but also three prisms for combining the optical images are required. To this end, the technology has a problem in that not only a configuration becomes more complex, but costs also increase to realize a high-resolution color display.

SUMMARY

In order to solve the problems, a projection display device according to an aspect of the present disclosure includes a first image light emission device configured to emit first image light, a second image light emission device configured to emit second image light, an optical combination system configured to combine the first image light with the second image light in a state in which the second image light is shifted in a first direction relative to the first image light, and emit combination light, a light path shift element configured to shift a light path for the combination light emitted from the optical combination system, and a display control circuit configured to control the first image light emission device, the second image light emission device, and the light path shift element, wherein one frame period includes a first field period and a second field period, the display control circuit supplies a data signal of a video pixel aligned in the first direction at an odd-numbered position in a second direction intersecting the first direction in video pixel data among data signals corresponding to gradation levels designated by the video pixel data arranged in a matrix to the first image light emission device, supplies a data signal of the video pixel aligned in the first direction at an even-numbered position in the second direction in the video pixel data to the second image light emission device, and controls the light path shift element so that the light path is set as a reference position in the first field period, and supplies a data signal of the video pixel aligned in the first direction at an even-numbered position in the second direction in the video pixel data to the first image light emission device, supplies a data signal of the video pixel aligned in the first direction at an odd-numbered position in the second direction in the video pixel data to the second image light emission device, and controls the light path shift element so that the light path is shifted in the second direction intersecting the first direction in the second field period, and the first image light emission device emits the first image light based on the supplied data signal, and the second image light emission device emits the second image light based on the supplied data signal.

BRIEF DESCRIPTION OF THE DRAWINGS

FIG. 3 is a diagram illustrating an arrangement of video pixels in the projection display device.

FIG. 4 is a diagram illustrating disposition of panel pixels in the projection display device.

FIG. 5 is a perspective view illustrating a configuration of a liquid crystal panel in the projection display device.

DESCRIPTION OF EMBODIMENTS

Hereinafter, a projection display device according to an embodiment will be described with reference to the drawings. In each drawing, dimensions and scales of each portion are appropriately different from actual ones. Further, since embodiments to be described below are preferred specific examples, various technically preferable limitations are applied, but the scope of the present disclosure is not limited to these embodiments unless it is otherwise stated in the following description that the present disclosure is limited.

Figure 1:
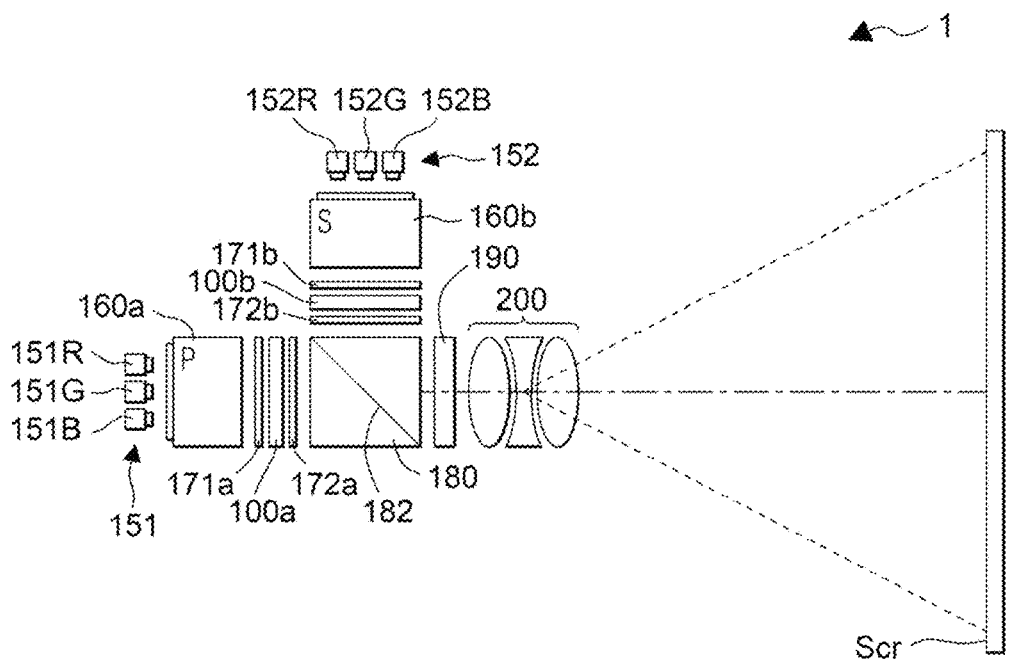
FIG. 1 is a diagram illustrating a projection display device according to a first embodiment.

FIG. 1 is a diagram illustrating an optical configuration of a projection display device 1 according to a first embodiment. The projection display device 1 includes liquid crystal panels 100a and 100b, light sources 151 and 152, optical polarization systems 160a and 160b, a prism 180, a light path shift element 190, and a projection lens 200.

The light source 151 includes laser light sources 151R, 151G, and 151B. Among the laser light sources 151R, 151G, and 151B, the laser light source 151R emits light including a red wavelength range, the laser light source 151G emits light including a green wavelength range, and the laser light source 151B emits light including a blue wavelength range.

The optical polarization system 160a diffuses the light emitted from the laser light sources 151R, 151G, and 151B, forms the light into a substantially parallel light beam with a substantially uniform illuminance, converts the light beam to P-polarized light, and emits the P-polarized light toward the transmissive liquid crystal panel 100a. The conversion to the P-polarized light also includes transmitting the P-polarized light. A polarization plate 171a is provided between an emission surface of the optical polarization system 160a and an incidence surface of the liquid crystal panel 100a, and a polarization plate 172a is provided on an emission surface of the liquid crystal panel 100a.

A transmission axis of the polarization plate 171a is P-polarized light, and a transmission axis of the polarization plate 172a is S-polarized light. To this end, a P-polarized light component not modulated by the liquid crystal panel 100a is blocked by the polarization plate 172a.

The light source 152 includes laser light sources 152R, 152G, and 152B, similar to the light source 151. Among the laser light sources 152R, 152G, and 152B, the laser light source 152R emits light including a red wavelength range, the laser light source 152G emits light in a green wavelength range, and the laser light source 152B emits light in a blue wavelength range.

The optical polarization system 160b diffuses the light emitted from the laser light sources 152R, 152G, and 152B, forms the light into a substantially parallel light beam with a substantially uniform illuminance, converts the light beam into S-polarized light, and emits the S-polarized light toward the transmissive liquid crystal panel 100b. The conversion to the S-polarized light also includes transmitting the S-polarized light. A polarization plate 171b is provided between an emission surface of the optical polarization system 160b and an incidence surface of the liquid crystal panel 100b, and a polarization plate 172b is provided on an emission surface of the liquid crystal panel 100b.

A transmission axis of the polarization plate 171b is S-polarized light, and a transmission axis of the polarization plate 172b is P-polarized light. To this end, an S-polarized light component not modulated by the liquid crystal panel 100b is blocked by the polarization plate 172b.

The liquid crystal panels 100a and 100b include a plurality of pixel circuits, as will be described below. Each of the plurality of pixel circuits includes a liquid crystal element. A liquid crystal element of the liquid crystal panel 100a is driven based on a data signal supplied from a display control circuit, and modulates incident light according to a voltage of the data signal. This modulation changes an amount of light passing through the polarization plate 172a, that is, changes transmittance. To this end, the modulation in the liquid crystal elements is individually controlled based on the data signal so that a transmission image is generated in the liquid crystal panel 100a. Similarly, a transmission image is generated in the liquid crystal panel 100b.

The transmission image from the liquid crystal panel 100a is incident on the prism 180 from a 9 o'clock direction in FIG. 1, and the transmission image from the liquid crystal panel 100b is incident on the prism 180 from a 12 o'clock direction. At a joint surface 182 of the prism 180, the S-polarized light of the transmission image from the liquid crystal panel 100a is transmitted and travels straight, and the P-polarized light of the transmission image from the liquid crystal panel 100b is reflected.

Therefore, the transmission image from the liquid crystal panel 100a and the transmission image from the liquid crystal panel 100b are combined in the prism 180, and a combination image is emitted in a 3 o'clock direction. The combination image from the prism 180 is incident on the projection lens 200 via the light path shift element 190. The projection lens 200 enlarges and projects the combination image via the light path shift element 190 onto the screen Scr.

The light path shift element 190 shifts a light path of the light emitted from the prism 180 to shift the combination image to be projected onto the screen Scr in a left-right direction or an up-down direction with respect to the projection surface.

At the joint surface 182 of the prism 180, the transmission image from the liquid crystal panel 100a travels straight, whereas the transmission image from the liquid crystal panel 100b is reflected. Therefore, the transmission image from the liquid crystal panel 100b is generated to be horizontally inverted with respect to the transmission image from the liquid crystal panel 100a. F Further, the transmission image from the liquid crystal panel 100a and the transmission image from the liquid crystal panel 100b have mismatched pixels and are combined in a shifted state, as will be described below.

Figure 2:
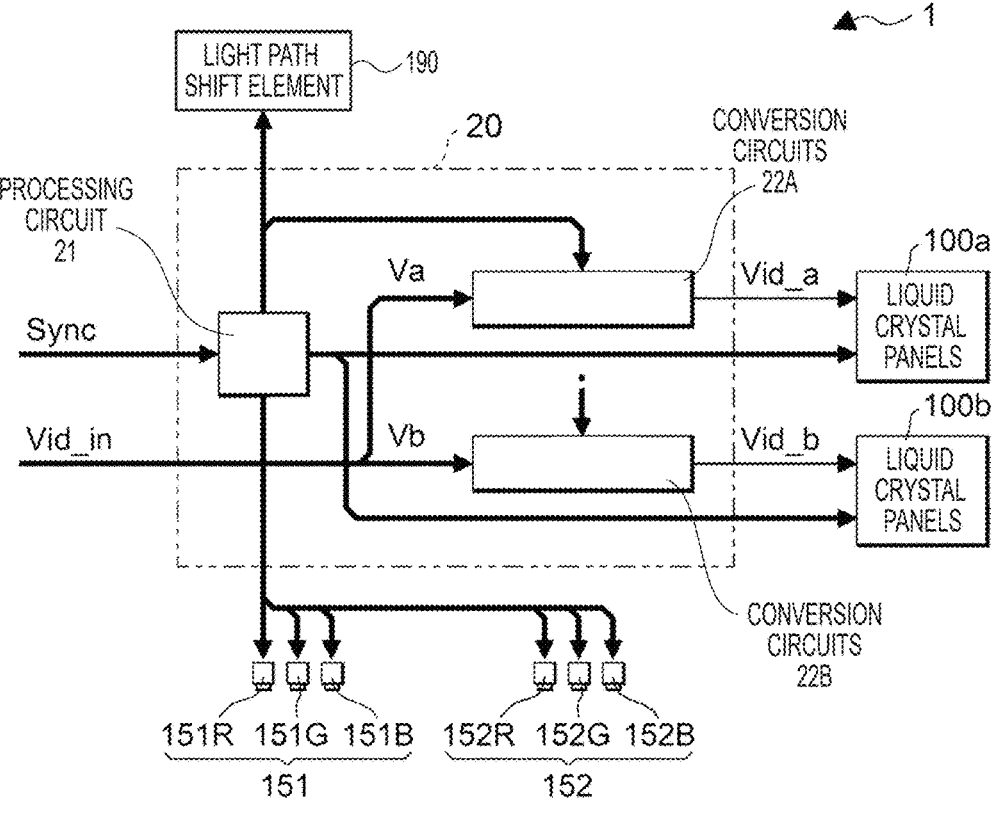
FIG. 2 is a block diagram illustrating a configuration of the projection display device.

FIG. 2 is a block diagram illustrating an electrical configuration of the projection display device 1. As illustrated in the figure, the projection display device 1 includes a display control circuit 20, in addition to the liquid crystal panels 100a and 100b, the light sources 151 and 152, and the light path shift element 190 described above.

Video data Vid_in is supplied from an upper device such as a host device (not illustrated) in synchronization with a synchronization signal Sync. The video data Vid_in designates a gradation level of pixels in an image constituting one-frame period of a video, for example, in 8 bits for each RGB.

The pixels of the image designated by the video data Vid_in are referred to as video pixels, and data for designating the gradation level of the video pixel is referred to as video pixel data, but there may be no particular distinction between the video pixel and the video pixel data. Further, a pixel of an image before or after the combination in the liquid crystal panel 100a or 100b is referred to as a panel pixel. A position of the panel pixel shifted by the light path shift element 190 and projected onto the screen Scr is referred to as a projection position.

In the liquid crystal panels 100a and 100b, panel pixels corresponding to the pixel circuits are arranged in a matrix in a plan view. In the embodiment, an arrangement of the video pixels designated by the video data Vid_in is, for example, twice as large in a vertical direction and twice as large in a horizontal direction as an arrangement of the panel pixels from the liquid crystal panel 100a or 100b.

The synchronization signal Sync includes a vertical synchronization signal for instructing the start of vertical scanning of the video data Vid_in, a horizontal synchronization signal for instructing the start of horizontal scanning, and a clock signal indicating a timing for one video pixel in the video data Vid_in.

The display control circuit 20 includes a processing circuit 21 and conversion circuits 22a and 22b.

The processing circuit 21 controls the conversion circuits 22a and 22b, and the liquid crystal panels 100a and 100b in each writing period which will be described later, based on the synchronization signal Sync, and controls the light sources 151 and 152 and the light path shift element 190 in each field period which will be described later. The light path shift element 190 shifts the projection position in each field period under the control of the processing circuit 21.

FIG. 3 is a diagram illustrating a part of an arrangement of video pixels represented by the video data Vid_in.

In the figure, A1 to A4 are assigned as symbols in a first row, B1 to B4 in a second row, C1 to C4 in a third row, and D1 to D4 in a fourth row, for convenience, in order to distinguish the video pixels in the video represented by the video data Vid_in.

The description will return to FIG. 2. In the video data Vid_in, video pixel data for designating a gradation level of the video pixel represented by the liquid crystal panel 100a is indicated by Va, and video pixel data for designating a gradation level of the video pixel represented by the liquid crystal panel 100b is indicated by Vb.

The conversion circuit 22a temporarily stores the video pixel data Va for one or more frame periods in an internal buffer, reads video pixel data of a color component corresponding to a writing period, converts the video pixel data into an analog voltage data signal Vid a having a polarity corresponding to the writing period, and supplies the data signal to the liquid crystal panel 100a.

The conversion circuit 22b is different from the conversion circuit 22a only in the video pixel data that is a conversion target, and is the same as the conversion circuit 22a in other respects. That is, the conversion circuit 22b temporarily stores the video pixel data Vb, reads the video pixel data of the color component corresponding to the writing period, converts the video pixel data into an analog voltage data signal Vid b having a polarity corresponding to the writing period, and supplies the data signal to the liquid crystal panel 100b.

A gradation level of which video pixel designated by the video pixel data Va and Vb will be described later.

FIG. 4 is a diagram illustrating the panel pixels corresponding to the arrangement of the video pixels in FIG. 3 among the panel pixels of the liquid crystal panel 100a and the panel pixels of the liquid crystal panel 100b.

For convenience of description, the panel pixels of the liquid crystal panel 100a are indicated as panel pixels a, and the panel pixels of the liquid crystal panel 100b are indicated as panel pixels b.

In an arrangement on a left side, a1 and a2 are assigned as symbols in a first row and a3 and a4 are assigned in a second row, for convenience, in order to distinguish the panel pixels a from each other, and in an arrangement on a right side, b1 and b2 are assigned in a first row and b3 and b4 are assigned in a second row, for convenience, in order to distinguish the panel pixels b.

As will be described later, in the liquid crystal panels 100a and 100b, a microlens is provided in each panel pixel in order to improve the efficiency of light use. To this end, the brightness of the panel pixel is not uniform when viewed in a plan view, and in reality, the panel pixel becomes bright near a center of the panel pixel and becomes dark from the vicinity of the center to the outside. In the figure, circles of the panel pixels a and b simply indicate portions that become brighter than other portions due to light collection in the microlens. A center of the circle substantially coincides with a diagonal center of the panel pixel a or b.

The dispositions of the panel pixels a and b with respect to the prism 180 have a relationship shown on a lower side of FIG. 4. In detail, the arrangement of the panel pixels b is shifted in a right direction in the figure by 0.5 pixels of the panel pixel with respect to the arrangement of the panel pixels a. Specifically, a center of the panel pixel b1 is located between a center of the panel pixel a1 and a center of the panel pixel a2, and a center of the panel pixel b3 is located between a center of the panel pixel a3 and a center of the panel pixel a4.

Next, the liquid crystal panels 100a and 100b will be described.

The liquid crystal panels 100a and 100b are different in only data signals to be supplied, and are the same in a structure. Therefore, the liquid crystal panels 100a and 100b will be generally described using 100 as a reference sign without any one of the liquid crystal panels 100a and 100b being specified.

Figure 6:
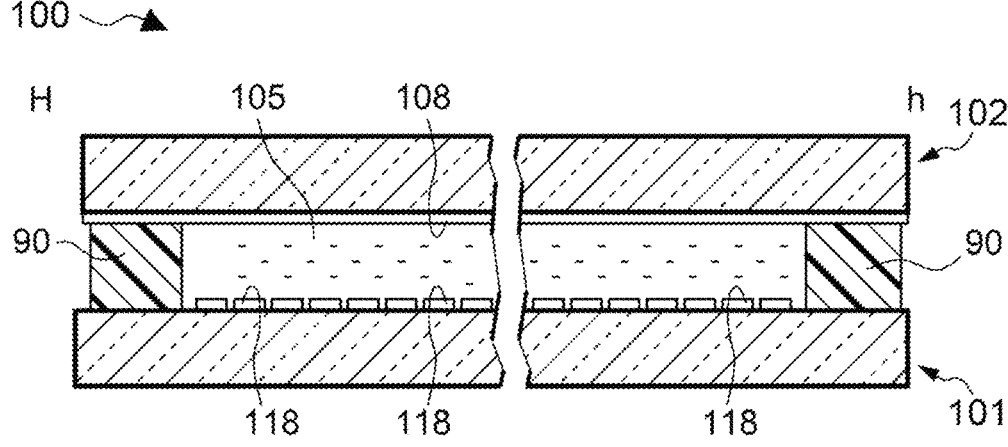
FIG. 6 is a cross-sectional view illustrating the structure of the liquid crystal panel.

FIG. 5 is a perspective view of the liquid crystal panel 100, and FIG. 6 is a cross-sectional view taken along a line H-h in FIG. 5.

As illustrated in these figures, in the liquid crystal panel 100, an element substrate 101 on which pixel electrodes 118 are provided and a counter substrate 102 on which a common electrode 108 is provided are bonded by a seal material 90 so that electrode formation surfaces face each other while maintaining a certain gap, and this gap is filled with a liquid crystal 105.

As the element substrate 101 and the counter substrate 102, a substrate having optical transparency, such as glass or quartz, is used. As illustrated in FIG. 5, one side of the element substrate 101 protrudes from the counter substrate 102. In this protruding area, a plurality of terminals 106 are provided along a horizontal direction in FIG. 5. One end of a flexible printed circuit (FPC) substrate (not illustrated) is coupled to the plurality of terminals 106. The other end of the FPC substrate is coupled to the display control circuit 20, and the above-described various signals are supplied.

On a surface of the element substrate 101 facing the counter substrate 102, the pixel electrodes 118 are provided by patterning a transparent conductive layer such as indium tin oxide (ITO).

Further, although not illustrated, a microlens is provided in each panel pixel on the counter substrate 102 (or the element substrate 101) in order to efficiently send a large amount of light to an opening that becomes the panel pixel. With this configuration, light blocked by a light shielding portion is sent to an opening of the microlens, thereby improving the efficiency of light use. The light shielding portion is provided to determine an outer edge of the panel pixels or to prevent light leakage in the transistor.

Figure 7:
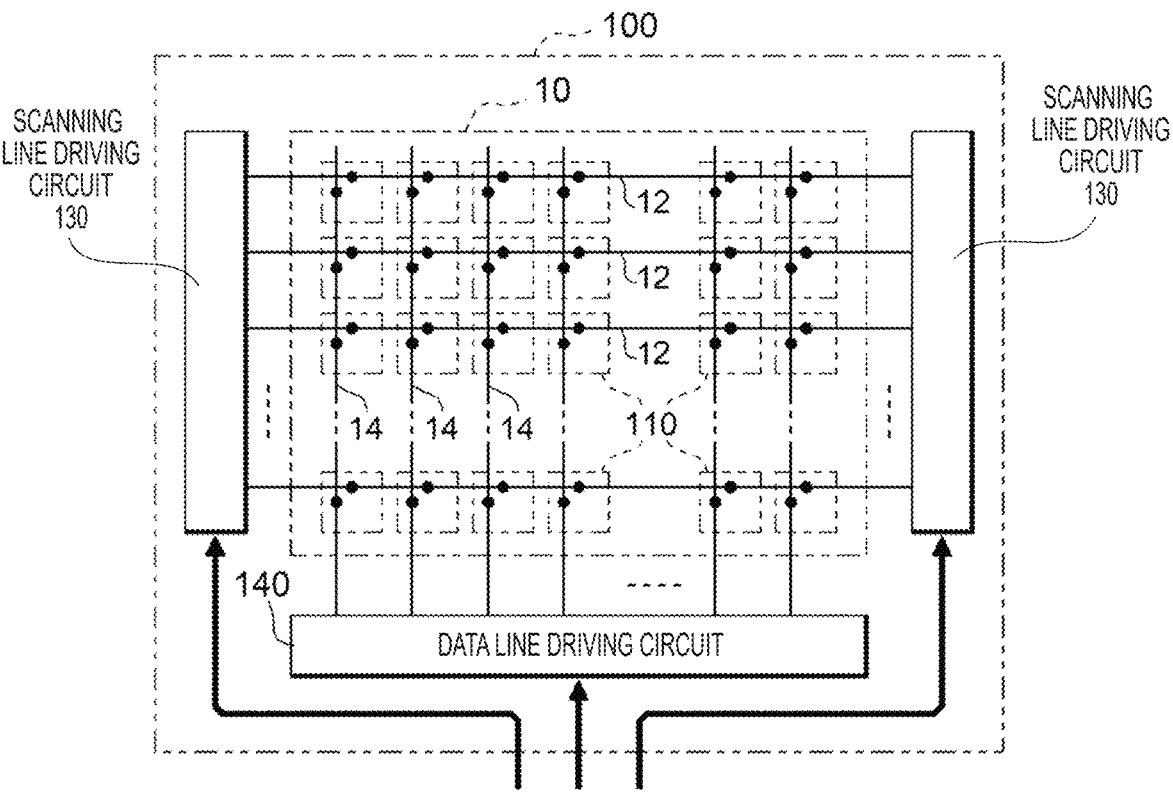
FIG. 7 is a block diagram illustrating an electrical configuration of the liquid crystal panel.

FIG. 7 is a block diagram illustrating an electrical configuration of the liquid crystal panel 100. The liquid crystal panel 100 is provided with a scanning line driving circuit 130 and a data line driving circuit 140 on a periphery of the display area 10.

In the display area 10, pixel circuits 110 are arranged in a matrix. In detail, in the display area 10, a plurality of scanning lines 12 are provided to extend in a horizontal direction in the figure, and a plurality of data lines 14 are provided to extend in a vertical direction and to be electrically insulated from the scanning lines 12. The pixel circuits 110 are provided in a matrix to correspond to intersections between the plurality of scanning lines 12 and the plurality of data lines 14.

When the number of scanning lines 12 is m and the number of data lines 14 is n, the pixel circuits 110 are arranged in a matrix of m vertical rows and n horizontal columns. Both m and n are integers equal to or equal to 2. In order to distinguish the rows of the matrix in the scanning lines 12 and the pixel circuits 110, the rows may be referred to as 1, 2, 3, . . . , (m−1), mth row in order from the top in the figure. Similarly, in order to distinguish the columns of the matrix in the data lines 14 and the pixel circuits 110, the columns may be referred to as 1, 2, 3, . . . , (n−1), nth column in order from the left in the figure.

Since the video pixels are arranged twice as large a vertical direction and twice as large in a horizontal direction as the arrangement of the panel pixels, the arrangement of the video pixels is (2m) rows (2n) columns.

"Row" and "column" are relative concepts, and when one of a horizontal (left-right) direction and a vertical (up-down) direction is defined as the "row", the other of is defined as the "column". However, in the present description, for convenience, a horizontal direction in which the scanning line 12 extends is defined as the "row", and a vertical direction in which the data line 14 extends is defined as the "column". The same is applied to an odd-numbered row and an even-numbered row and to an odd-numbered column and an even-numbered column, and when one of the horizontal direction and the vertical direction is defined as an odd-numbered row and an even-numbered row, the other of the horizontal direction and the vertical direction is defined as an odd-numbered column and an even-numbered column.

Further, an integer i of 1 or more and m or less may be used to generally describe the rows of the scanning lines 12, the panel pixels, or the video pixels. Further, an integer j of 1 or more and n or less may be used to generally describe the columns of the data lines 14, the panel pixels, or the video pixels.

The scanning line driving circuit 130 selects the scanning lines 12 one by one in order of, for example, the first, second, third, . . . , mth rows under the control of the display control circuit 20, and sets a scanning signal to the selected scanning line 12 to a H level. The scanning line driving circuit 130 sets a scanning signal to the scanning lines 12 other than the selected scanning line 12 to a L level.

The data line driving circuit 140 outputs a data signal supplied from the corresponding conversion circuit 22a or 22b to the pixel circuits 110 of the columns 1 to n located on the scanning line 12 via the data line 14 in a period in which the scanning signal to the scanning line 12 has reached the H level.

Figure 8:
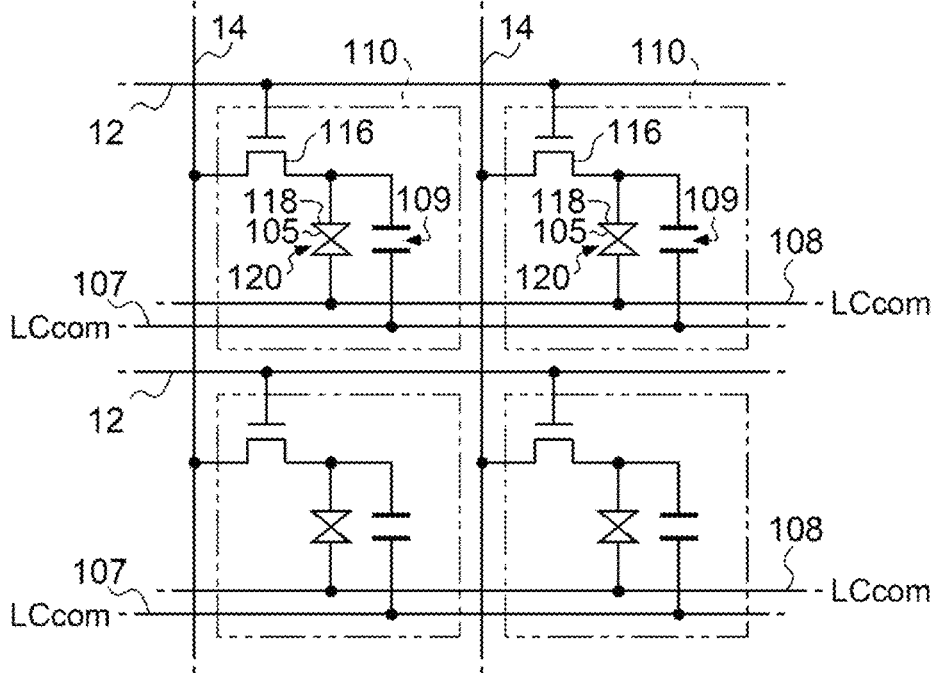
FIG. 8 is a diagram illustrating a configuration of a pixel circuit in a liquid crystal panel.

FIG. 8 is a diagram illustrating an equivalent circuit of four pixel circuits 110 in total including two vertical rows two horizontal columns that correspond to intersections of two adjacent scanning lines 12 and two adjacent data lines 14.

As illustrated in FIG. 8, the pixel circuit 110 includes a transistor 116 and a liquid crystal element 120. The transistor 116 is, for example, an n-channel thin film transistor. In the pixel circuit 110, the transistor 116 has a gate node coupled to the scanning line 12, a source node coupled to the data line 14, and a drain node coupled to the pixel electrode 118 having a square shape in a plan view.

The common electrode 108 is provided in common to all the pixels to face the pixel electrode 118. A voltage LCcom is applied to the common electrode 108. As described above, the liquid crystal 105 is sandwiched between the pixel electrodes 118 and the common electrode 108. Therefore, the liquid crystal element 120 in which the liquid crystal 105 is sandwiched between the pixel electrodes 118 and the common electrode 108 is formed in each pixel circuit 110.

Further, a storage capacitor 109 is provided in parallel with the liquid crystal element 120. The storage capacitor 109 has one terminal coupled to the pixel electrode 118, and the other terminal coupled to a capacitance line 107. A voltage that is constant over time such as the voltage LCcom that is the same as the voltage applied to the common electrode 108 is applied to the capacitance line 107. Since the pixel circuits 110 are arranged in a matrix in a horizontal direction which is a direction in which the scanning lines 12 extend and a vertical direction which is a direction in which the data lines 14 extend, the pixel electrodes 118 included in the pixel circuits 110 are also arranged in a matrix in the vertical direction and the horizontal direction.

In the scanning line 12 on which the scanning signal has reached the H level, the transistor 116 of the pixel circuit 110 provided to correspond to the scanning line 12 enters an on state. Since the data line 14 and the pixel electrode 118 are electrically coupled when the transistor 116 enters the on state, the data signal supplied to the data line 14 reaches the pixel electrode 118 through the transistor 116 that has entered the on state. When the scanning line 12 becomes at the L level, the transistor 116 enters an off state, but a voltage of the data signal that has reached the pixel electrode 118 is held by a capacitance of the liquid crystal element 120 and the storage capacitor 109.

As is well known, in the liquid crystal element 120, orientation of liquid crystal molecules changes depending on an electric field generated by the pixel electrode 118 and the common electrode 108. Therefore, the liquid crystal element 120 has a transmittance according to an effective value of an applied voltage.

An area of the liquid crystal element 120 functioning as a panel pixel, that is, an area having a transmittance according to the effective value of the voltage is an area where the pixel electrode 118 and the common electrode 108 overlap when the element substrate 101 and the counter substrate 102 are viewed in plan. Since the pixel electrode 118 has the square shape in plan view, a shape of the panel pixel of the liquid crystal panel 100 is also a square shape.

Further, in the present embodiment, the liquid crystal 105 is of a vertical alignment (VA) type, and is in a normally black mode in which a transmittance is lowest when a voltage applied to the liquid crystal element 120 is zero, and increases as the applied voltage increases.

A writing operation for supplying the data signal to the pixel electrode 118 of the liquid crystal element 120 is executed in order of the first, second, third, . . . , mth rows. Accordingly, a voltage corresponding to the data signal is held in each of the liquid crystal elements 120 of the pixel circuits 110 arranged in m rows n columns, each liquid crystal element 120 has a desired transmittance, and a transmission image is generated by the liquid crystal elements 120 arranged in m rows n columns.

Since application of a DC voltage to the liquid crystal element 120 causes deterioration of the liquid crystal 105, a positive voltage and a negative voltage are applied alternately to the pixel electrode 118 of the liquid crystal element 120. That is, the liquid crystal element 120 is driven by an AC voltage. A reference of the polarity is generally the voltage LCcom applied to the common electrode 108. A case where a data signal higher than the voltage LCcom is applied to the pixel electrode 118 is called positive polarity writing, and a case where a data signal lower than the voltage LCcom is applied is called negative polarity writing. The reference of the polarity may be a voltage different from the voltage LCcom in consideration of push-down of the transistor 116.

As described above, when the combination is performed by the prism 180, the arrangement of the panel pixels b is shifted by the 0.5 pixels of the panel pixel in the right direction with respect to the arrangement of the panel pixels a. To this end, in the combination image of the transmission images from the liquid crystal panels 100a and 100b, the panel pixels are arranged in m rows and 2n columns.

Since the video pixels of the image designated by the video data Vid_in are arranged in 2m rows and 2n columns, the combination image lacks resolution in the vertical direction (column direction).

Then, an operation for doubling the resolution in a vertical direction of the combination image and causing the combination image to be visually recognized will be described next.

Figure 9:
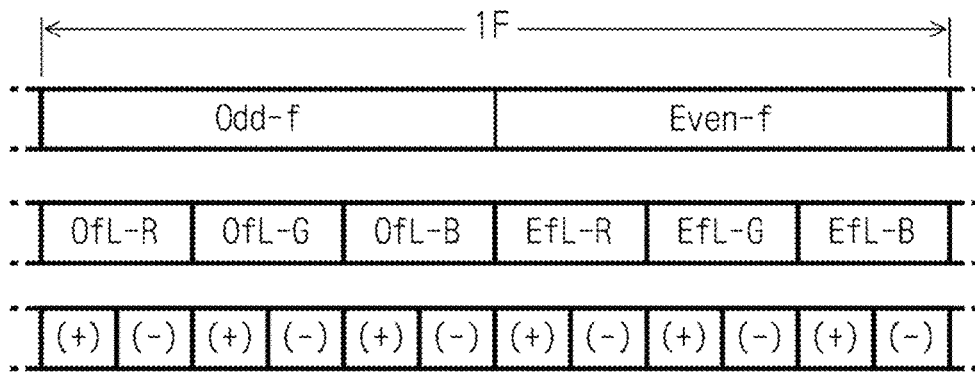
FIG. 9 is a diagram illustrating an operation in a one-frame period of a projection display device.
Figure 9:
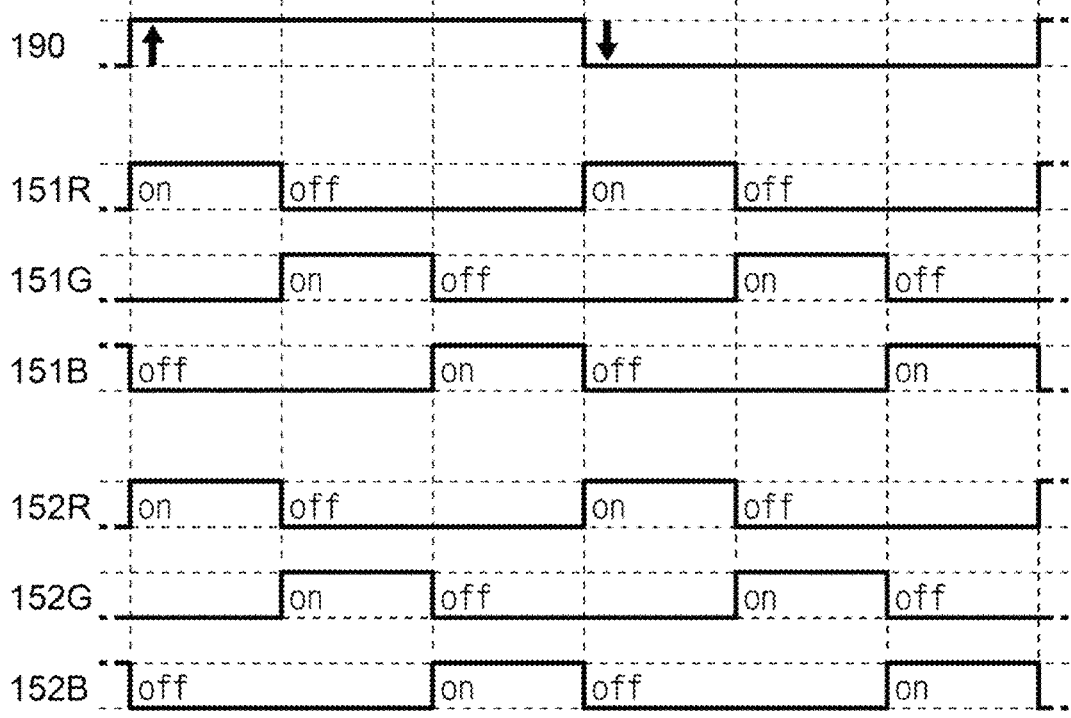

FIG. 9 is a diagram illustrating an operation of the projection display device 1 according to the first embodiment.

As shown in the figure, in the present embodiment, one frame period (1F) is divided into an odd-numbered field period (Odd-f) that is earlier in time and an even-numbered field period (Even-f) that is later in time. The one-frame period (1F) is a period in which one frame of the video represented by the video data Vid_in is supplied, and is 16.7 milliseconds of one cycle when a frequency of the vertical synchronization signal included in the synchronization signal Sync is 60 Hz.

In the first embodiment, the odd-numbered field period (Odd-f) is a period in which the panel pixel a of the liquid crystal panel 100a represents a video pixel in the odd-numbered row and the odd-numbered column, and the panel pixel b of the liquid crystal panel 100b represents a video pixel in the odd-numbered row and the even-numbered column. In other words, the odd-numbered field period (Odd-f) is a period in which the video pixel in the odd-numbered row is represented by a combination image of the panel pixels a and b.

Further, in the odd-numbered field period (Odd-f), the data signal Vid_a supplied to the liquid crystal panel 100a by the conversion circuit 22a corresponds to the gradation level of the video pixel located in the odd-numbered row and the odd-numbered column. Further, in the odd-numbered field period (Odd-f), the data signal Vid_b supplied to the liquid crystal panel 100b by the conversion circuit 22b corresponds to the gradation level of the video pixel located in the odd-numbered row and the even-numbered column.

The even-numbered field period (Even-f) is a period in which the panel pixel a of the liquid crystal panel 100a represents the video pixel in the even-numbered row and the odd-numbered column, and the panel pixel b of the liquid crystal panel 100b represents the video pixel in the even-numbered row and the even-numbered column. In other words, the even-numbered field period (Even-f) is a period in which the video pixels in the even-numbered rows are represented by the combination image of the panel pixels a and b.

In the even-numbered field period (Even-f), the data signal Vid_a supplied to the liquid crystal panel 100a by the conversion circuit 22a corresponds to the gradation level of the video pixel located in the even-numbered row and the odd-numbered column. Further, in the even-numbered field period (Even-f), the data signal Vid_b supplied to the liquid crystal panel 100b by the conversion circuit 22b corresponds to the gradation level of the video pixel located in the even-numbered row and the even-numbered column.

Specifically, in the first embodiment, in the odd-numbered field period (Odd-f), the panel pixel a in row i and column j represents the video pixel in row (2i−1) and column (2j−1), and the panel pixel b in row i and column j represents the video pixel in row (2i−1) and column (2j).

Further, in the even-numbered field period (Even-f), the panel pixel a in row i and column j represents the video pixel in row (2i) and column (2j−1), and the panel pixel b in row i and column j represents the video pixel in row (2i) and column (2j).

(2i−1) and (2j−1) are both odd numbers, and (2i) and (2j) are both even numbers.

When the panel pixel "represents" a certain video pixel, this means a state in which the liquid crystal element 120 of the panel pixel has a transmittance corresponding to the gradation level (video pixel data) of the video pixel.

Further, when one frame period (1F) is 16.7 milliseconds, the odd-numbered field period (Odd-f) and the even-numbered field period (Even-f) are ½ thereof, 8.33 milliseconds.

In the first embodiment, the video pixel data Va supplied to the conversion circuit 22a designates the gradation level of the video pixel located in the odd-numbered row and odd-numbered column in the odd-numbered field period (Odd-f), and designates the gradation level of the video pixels located in the odd-numbered rows and the even-numbered columns in the even-numbered field period (Even-f). The video pixel data Vb supplied to the conversion circuit 22b designates the gradation level of the video pixel located in the even-numbered row and the odd-numbered column in the odd-numbered field period (Odd-f), and designates the gradation level of the video pixels located in the even-numbered rows and the even-numbered columns in the even-numbered field period (Even-f).

The odd-numbered field period (Odd-f) is further divided into three unit periods, and in each unit period, one panel pixel individually represents the RGB components of the corresponding video pixel. That is, in the three unit periods of the odd-numbered field period (Odd-f), one panel pixel represents the RGB components of the video pixel in color sequence, that is, color in a time-division manner.

A period in the odd-numbered field period (Odd-f) in which the panel pixel represents the R component of the video pixel in the odd-numbered row is called OfL-R, a period in which the panel pixel represents the G component is called OfL-G, and a period in which the panel pixel represents the B component is called OfL-B.

Similarly, the even-numbered field period (Even-f) is divided into three periods including a unit period (EfL-R) in which the panel pixel represents the R component of the video pixel in the even-numbered row, a unit period (period EfL-G) in which the panel pixel represents the G component, and a period (EfL-B) in which the panel pixel represents the B component.

When the odd-numbered field period (Odd-f) and the even-numbered field period (Even-f) are 8.33 milliseconds, the unit periods (OfL-R, OfL-G, OfL-B, EfL-R, EfL-G, and EfL-B) are ⅓ thereof, 2.78 milliseconds.

Further, each of the unit periods (OfL-R, OfL-G, OfL-B, EfL-R, EfL-G, and EfL-B) is further divided into a writing period (+) for writing a positive polarity data signal and a writing period (−) for writing a negative polarity data signal.

In the first embodiment, the processing circuit 21 controls the light path shift element 190 as follows. When the projection position in the odd-numbered field period (Odd-f) is set to the reference position, the processing circuit 21 shifts the projection position in a downward direction by 0.5 pixels of the panel pixel in the even-numbered field period (Even-f). When the even-numbered field period (Even-f) ends, the processing circuit 21 controls the light path shift element 190 so that the projection position is shifted in an upward direction by 0.5 pixels of the panel pixel in the odd-numbered field period and is returned to the reference position.

The downward direction is a vertical scanning direction, that is, a direction in which the scanning lines 12 are selected in order, and is, for example, a direction from the panel pixel a1 to a3 in FIG. 4. Further, in FIG. 9, when the control signal to the light path shift element 190 is at the H level, the projection position is the reference position, and when the control signal is at the L level, the projection position is shifted in the downward direction by the 0.5 pixels of the panel pixel from the reference position.

The processing circuit 21 controls the light sources 151 and 152 as follows.

In detail, first, the processing circuit 21 controls the laser light sources 151R and 152R so that the laser light sources 151R and 152R enter the on state and controls the other laser light sources so that the other laser light sources enter the off state in the unit period (OfL-R) of the odd-numbered field period (Odd-f) and the unit period (EfL-R) of the even-numbered field period (Even-f).

The on state in the laser light source refers to a state in which the laser light source emits light, and the off state in the laser light source refers to a state in which the laser light source does not emit light.

Second, the processing circuit 21 controls the laser light sources 151G and 152G so that the laser light sources 151G and 152G enter the on state, and controls the other laser light sources so that the other laser light sources enter the off state in the unit period (OfL-G) of the odd-numbered field period (Odd-f) and the unit period (EfL-G) of the even-numbered field period (Even-f).

Third, the processing circuit 21 controls the laser light sources 151B and 152B so that the laser light sources 151B and 152B enter the on state, and controls the other laser light sources so that the other laser light sources enter the off state in the unit period (OfL-B) of the odd-numbered field period (Odd-f) and the unit period (EfL-B) of the even-numbered field period (Even-f).

Figure 10:
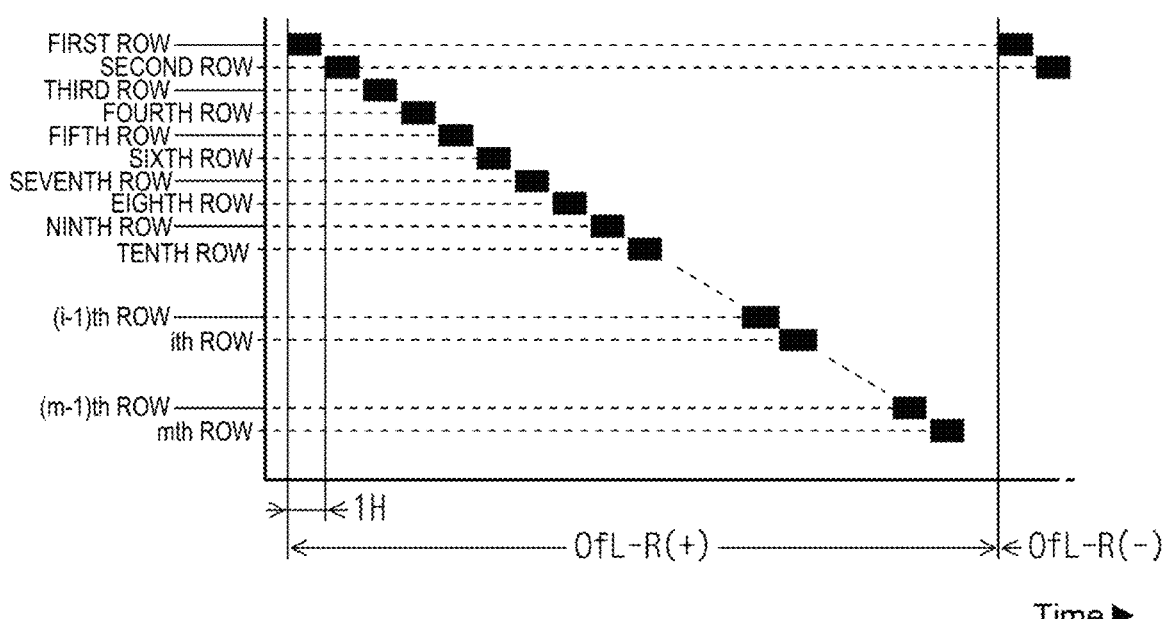
FIG. 10 is a diagram illustrating a writing operation in a liquid crystal panel.

FIG. 10 is a diagram illustrating a time transition of the scanning lines 12 to be selected in the liquid crystal panels 100a and 100b with a vertical axis representing the number of rows of the scanning lines 12 from a first row to an mth row and a horizontal axis representing an elapsed time. In the figure, an example of a positive polarity writing period (+) in the unit period (OfL-R) is shown.

When the selection of the scanning lines 12 is indicated by a thick black line, the scanning lines 12 are exclusively selected row by row in each horizontal scanning period (1H), such that the selected scanning lines 12 are sequentially shifted from the first row to the mth row over time.

The positive polarity writing period (+) in the unit period (OfL-R) is followed by a negative polarity writing period (−). The scanning lines 12 are exclusively selected in order from the first row to the mth row in each horizontal scanning period (1H) similarly in the negative polarity writing period (−).

Further, although the unit period (OfL-R) in the odd-numbered field period (Odd-f) has been described herein, the scanning lines 12 are exclusively selected in each horizontal scanning period (1H) in order from the first row to the mth row similarly in the writing periods of the unit periods (OfL-G and OfL-B), and the unit periods (EfL-R, EfL-G, and EfL-B) in the even-numbered field period (Even-f).

Figure 11:
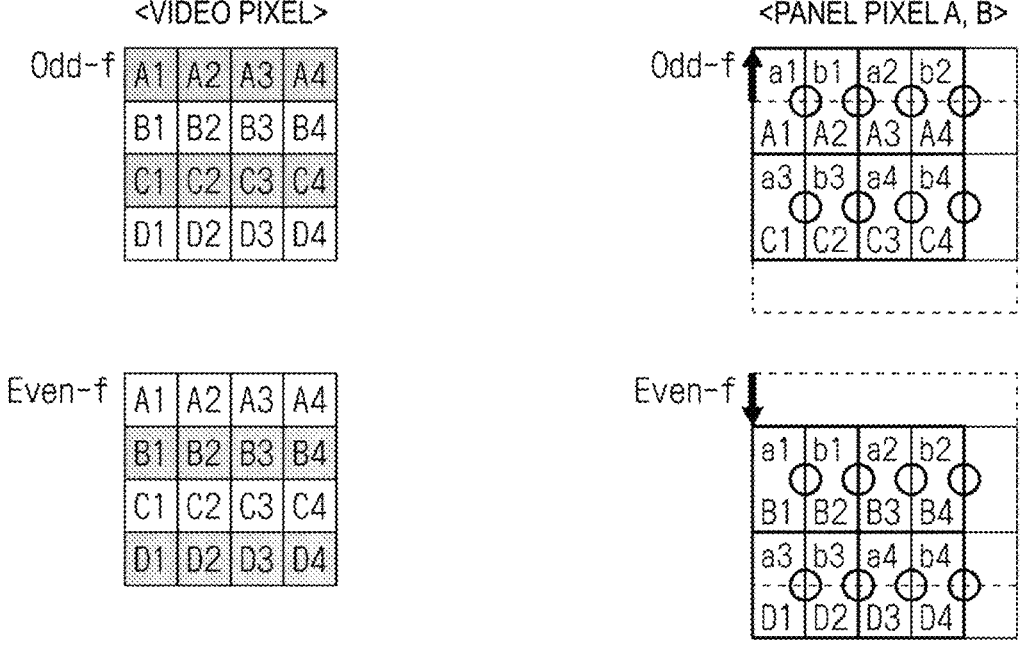
FIG. 11 is a diagram illustrating a relationship between video pixels, panel pixels, and projection positions in a one-frame period.

FIG. 11 is a diagram illustrating which video pixels and at which projection positions the panel pixels a and b represent in the first embodiment. In detail, FIG. 11 is a diagram illustrating at what projection positions the four panel pixels a1 to a4 on the upper left side of FIG. 4 and the four panel pixels b1 to b4 on the upper right side of FIG. 4 represent the video pixels illustrated in FIG. 3 in the odd-numbered field period (Odd-f) and the even-numbered field period (Even-f).

As shown in the figure, in the odd-numbered field period (Odd-f), the panel pixels a1 to a4 represent the hatched video pixels A1, A3, C1, and C3 in the odd-numbered row and the odd-numbered column in order. In other words, in the unit periods (OfL-R, OfL-G, and OfL-B) of the odd-numbered field period (Odd-f), the data signals of the R, G, and B components of the video pixels A1, A3, C1, and C3 are supplied to the panel pixels a1 to a4 in order, and the R, G, and B components are represented in order.

Further, in the odd-numbered field period (Odd-f), the panel pixels b1 to b4 represent the hatched video pixels A2, A4, C2, and C4 in the odd-numbered rows and the even-numbered columns in order. In other words, in the unit periods (OfL-R, OfL-G, and OfL-B) of the odd-numbered field period (Odd-f), the data signals of the R, G, and B components of the video pixels A2, A4, C2, and C4 are supplied to the panel pixels b1 to b4 in order, and the R, G, and B components are represented in order.

An arrow pointing to an upward direction in the panel pixel of the odd-numbered field period (Odd-f) indicates the shift direction from the projection position in the immediately preceding even-numbered field period (Even-f).

The processing circuit 21 controls the laser light sources 151R and 152R so that the laser light sources 151R and 152R enter the on state in the unit period (OfL-R) of the odd-numbered field period (Odd-f). Therefore, in the unit period (OfL-R), the R components of the video pixels A1, A3, C1, C3, A2, A4, C2, and C4 represented by the panel pixels a1 to a4 and b1 to b4 are visually recognized by the user. Next, the processing circuit 21 controls the laser light sources 151G and 152G so that the laser light sources 151G and 152G enter the on state in the unit period (OfL-G). Therefore, the G components of the video pixels A1, A3, C1, C3, A2, A4, C2, and C4 represented by the panel pixels a1 to a4 and b1 to b4 are visually recognized by the user.

The processing circuit 21 controls the laser light sources 151B and 152B so that the laser light sources 151B and 152B enter the on state in the unit period (OfL-B). Therefore, the B components of the video pixels A1, A3, C1, C3, A2, A4, C2, and C4 represented by the panel pixels a1 to a4 and b1 to b4 are visually recognized by the user.

Thus, in the odd-numbered field period (Odd-f), the RGB components of the video pixels in the odd-numbered rows among the video pixels are represented in color sequence and as a result, are visually recognized in color by the user.

When the odd-numbered field period (Odd-f) ends, the even-numbered field period (Even-f) arrives. The processing circuit 21 controls the light path shift element 190 so that the projection position is shifted in a downward direction in the figure from the reference position by 0.5 pixels of the panel pixel.

In the even-numbered field period (Even-f), the panel pixels a1 to a4 represent the hatched video pixels B1, B3, D1, and D3 in the even-numbered rows and the odd-numbered columns in order. In other words, in the unit periods (EfL-R, EfL-G, and EfL-B) of the even-numbered field period (Even-f), the data signals of the R, G, and B components of the video pixels B1, B3, D1, and D3 are supplied to the panel pixels a1 to a4 in order, and the R, G, and B components are represented in order.

Further, in the even-numbered field period (Even-f), the panel pixels b1 to b4 represent the hatched video pixels B2, B4, D2, and D4 in the even-numbered rows and the even-numbered columns in order. In other words, in the unit periods (EfL-R, EfL-G, and EfL-B) of the even-numbered field period (Even-f), the data signals of the R, G, and B components of the video pixels B2, B4, D2, and D4 are supplied to the panel pixels b1 to b4 in order, and the R, G, and B components are represented in order.

An arrow pointing to the downward direction in the panel pixels in the even-numbered field period (Even-f) indicates a shift direction from the projection position in the immediately preceding odd-numbered field period (Odd-f).

The processing circuit 21 controls the laser light sources 151R and 152R so that the laser light sources 151R and 152R enter the on state in the unit period (EfL-R) of the even-numbered field period (Even-f). Therefore, in the unit period (EfL-R), the R components of the video pixels B1, B3, D1, D3, B2, B4, D2, and D4 represented by the panel pixels a1 to a4 and b1 to b4 are visually recognized by the user.

Next, the processing circuit 21 controls the laser light sources 151G and 152G so that the laser light sources 151G and 152G enter the on state in the unit period (EfL-G). Therefore, the G components of the video pixels B1, B3, D1, D3, B2, B4, D2, and D4 represented by the panel pixels a1 to a4 and b1 to b4 are visually recognized by the user.

The processing circuit 21 controls the laser light sources 151B and 152B so that the laser light sources 151B and 152B enter the on state in the unit period (EfL-B). Therefore, the B components of the video pixels B1, B3, D1, D3, B2, B4, D2, and D4 represented by the panel pixels a1 to a4 and b1 to b4 are visually recognized by the user.

Thus, in the even-numbered field period (Even-f), the RGB components of the video pixels in the even-numbered rows among the video pixels are represented in color sequence, and as a result, the user visually recognizes the image in color.

Therefore, when viewed throughout the odd-numbered field period (Odd-f) and the even-numbered field period (Even-f), the video pixels arranged in (2m) rows by (2n) columns are visually recognized in color by the user due to the combination image and shift of the liquid crystal panels 100a and 100b.

According to the first embodiment, a color image with a resolution four times higher than the resolution of the liquid crystal panels 100a and 100b can be visually recognized by the user using a configuration in which the liquid crystal panels 100a and 100b are shifted in a vertical direction by 0.5 pixels of the panel pixels.

In other words, in the present embodiment, since the liquid crystal panels 100a and 100b having a resolution that is ¼ of the resolution of the image to be visually recognized are sufficient, it is possible to construct the device at a lower cost than a case where liquid crystal panels having the same resolution as a projected image are used.

In the first embodiment, the arrangement of the panel pixels b in the liquid crystal panel 100a is shifted in a right direction by only 0.5 pixels of the panel pixel with respect to the arrangement of the panel pixels b in the liquid crystal panel 100a, but the present disclosure is not limited thereto.

A positional relationship between the liquid crystal panels 100a and 100b in a second embodiment different from the first embodiment will be described.

Figure 12:
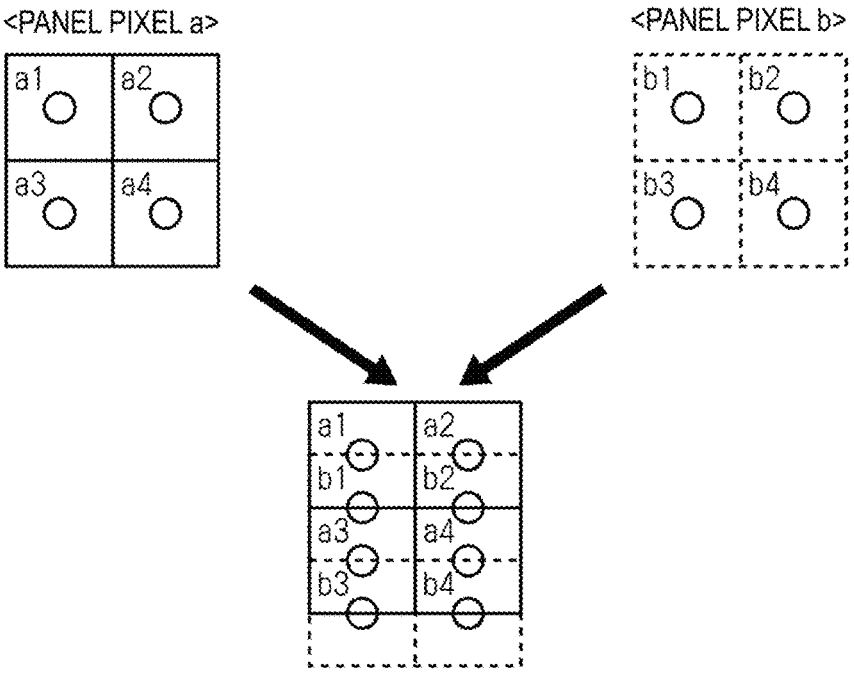
FIG. 12 is a diagram illustrating an arrangement of panel pixels in a projection display device according to a second embodiment.

FIG. 12 is a diagram illustrating panel pixels corresponding to the arrangement of video pixels in FIG. 3 extracted from the panel pixel a of the liquid crystal panel 100a and the panel pixel b of the liquid crystal panel 100b in the second embodiment. The liquid crystal panels 100a and 100b themselves are the same as those in the first embodiment, but the arrangement of the liquid crystal panels 100a and 100b relative to the prism 180 is as shown in a lower part of FIG. 12.

In detail, the arrangement of the panel pixels b is shifted in a downward direction in the figure by 0.5 pixels of the panel pixel with respect to the arrangement of the panel pixels a. Specifically, the panel pixel b1 is located between the panel pixels a1 and a3, and the panel pixel b2 is located between the panel pixels a2 and a4.

Figure 13:
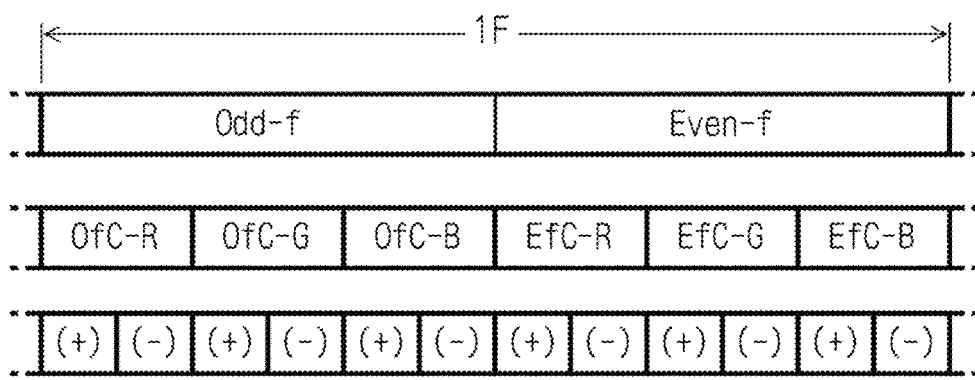
FIG. 13 is a diagram illustrating an operation in one frame period of the projection display device.
Figure 13:
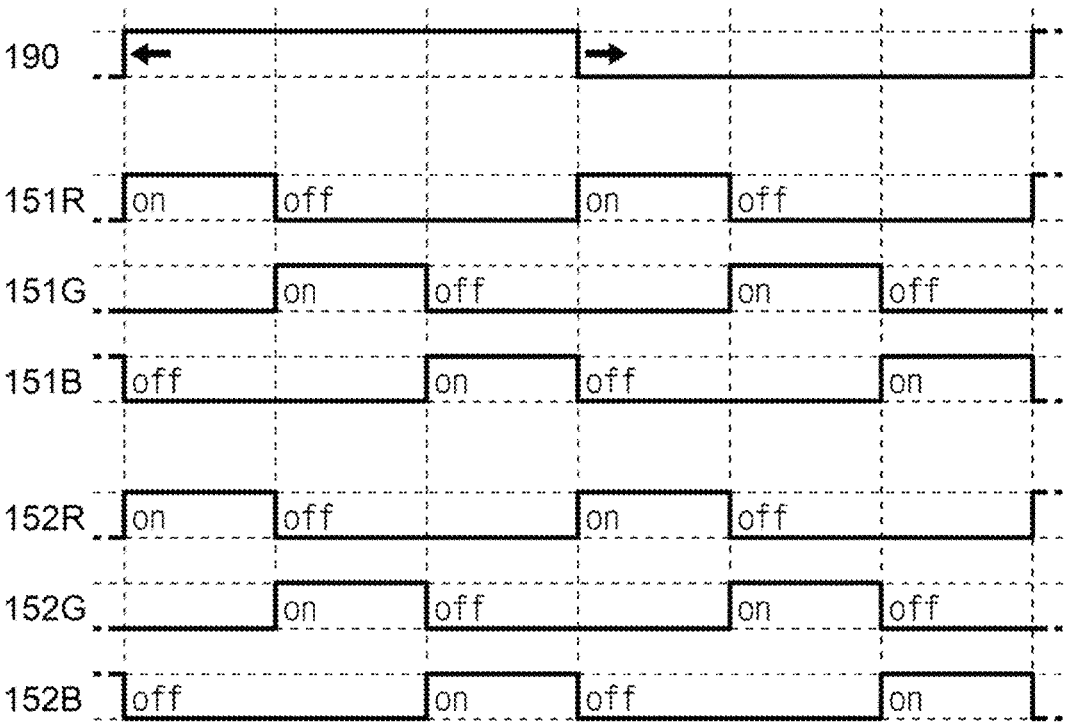

FIG. 13 is a diagram illustrating an operation of a projection display device 1 according to the second embodiment.

The second embodiment is the same as the first embodiment in that one frame period (1F) is divided into an odd-numbered field period (Odd-f) that is earlier in time and an even-numbered field period (Even-f) that is later in time, but is different from the first embodiment in that odd-numbered columns of video pixels are represented in the odd-numbered field period (Odd-f), and even-numbered columns of the video pixels are represented in the even-numbered field period (Even-f).

In detail, in the second embodiment, the odd-numbered field period (Odd-f) is a period in which the panel pixel a of the liquid crystal panel 100a represents a video pixel in the odd-numbered row and the odd-numbered column, and the panel pixel b of the liquid crystal panel 100b represents a video pixel in the even-numbered row and the odd-numbered column. The even-numbered field period (Even-f) is a period in which the panel pixel a represents the video pixel in the odd-numbered row and the even-numbered column, and the panel pixel b represents the video pixel in the even-numbered row and the even-numbered column.

Specifically, in the second embodiment, in an odd-field period (Odd-f), the panel pixel a in row i and column j represents the video pixel in row (2i−1) and column (2j−1), and the panel pixel b in row i and column j represents the video pixel in row (2i) and column (2j−1). Further, in the even-numbered field period (Even-f), the panel pixel a in row i and column j represents the video pixel in row (2i−1) and column (2j), and the panel pixel b in row i and column j represents the video pixel in row (i) and column (2j).

In the second embodiment, the conversion circuits 22a and 22b are the same as those in the first embodiment except for the video pixel data that is a conversion target. That is, in the second embodiment, the video pixel data Va supplied to the conversion circuit 22a designates the gradation level of the video pixel located in the odd-numbered row and odd-numbered column in the odd-numbered field period (Odd-f), and designates the gradation level of the video pixel located in the even-numbered row and the odd-numbered column in the even-numbered field period (Even-f). The video pixel data Vb supplied to the conversion circuit 22b designates the gradation level of the video pixel located in the odd-numbered row and the even-numbered column in the odd-numbered field period (Odd-f), and designates the gradation level of the video pixel located in the even-numbered row and the even-numbered column in the even-numbered field period (Even-f).

The second embodiment is the same as the first embodiment in that the odd-numbered field period (Odd-f) is divided into three unit periods, and in each unit period, one panel pixel individually represents the RGB components of the video pixel represented by the panel pixel, and that the even-numbered field period (Even-f) is divided into three periods, and in each period, one panel pixel individually represents the RGB components of the video pixel represented by the panel pixel. In the second embodiment, a unit period in which the panel pixel represents the R component of the video pixel in the odd-numbered column in the odd-numbered field period (Odd-f) is OfC-R, a unit period in which the panel pixel represents the G component is OfC-G, and a unit period in which the panel pixel represents the B component is OfC-B. Each of the three unit periods (OfC-R, OfC-G, and OfC-B) is divided into a writing period (+) for writing a positive polarity data signal and a writing period (−) for writing a negative polarity data signal.

Similarly, the even-numbered field period (Even-f) is divided into three unit periods including a unit period (EfC-R) in which the panel pixel represents the R component of the video pixel in the even-numbered column, a unit period (EfC-G) in which the panel pixel represents the G component, and a unit period (EfC-B) in which the panel pixel represents the B component, and each of the three unit periods is further divided into a writing period (+) for writing a positive polarity data signal and a writing period (−) for writing a negative polarity data signal.

In the second embodiment, the processing circuit 21 controls the light path shift element 190 as follows. The projection position in the odd-numbered field period (Odd-f) is set as a reference position. In the even-numbered field period (Even-f), the processing circuit 21 shifts the projection position in a right direction by 0.5 pixels of the panel pixel. When the even-numbered field period (Even-f) ends, the processing circuit 21 controls the light path shift element 190 so that the projection position is shifted in a left direction by 0.5 pixels of the panel pixel in the odd-numbered field period (Odd-f) and is returned to the reference position.

The right direction is a horizontal scanning direction, and is, for example, a direction from the panel pixel a1 to the panel pixel a2 in FIG. 12. Further, in FIG. 13, when the control signal to the light path shift element 190 is at the H level, the projection position is the reference position, and when the control signal is at the L level, the projection position is shifted in the right direction by the 0.5 pixels of the panel pixel from the reference position.

In the second embodiment, the processing circuit 21 controls the light sources 151 and 152 as in the first embodiment.

In detail, first, in the unit period (OfC-R) of the odd-numbered field period (Odd-f) and the unit period (EfC-R) of the even-numbered field period (Even-f), the processing circuit 21 controls the laser light sources 151R and 152R so that the laser light sources 151R and 152R enter the on state and controls the other laser light sources so that the other laser light sources enter the off state.

Second, in the unit period (OfC-G) of the odd-numbered field period (Odd-f) and the unit period (EfC-G) of the even-numbered field period (Even-f), the processing circuit 21 controls the laser light sources 151G and 152G so that the laser light sources 151G and 152G enter the on state and controls the other laser light sources so that the other laser light sources enter the off state.

Third, in the unit period (OfC-B) of the odd-numbered field period (Odd-f) and the unit period (EfC-B) of the even-numbered field period (Even-f), the processing circuit 21 controls the laser light sources 151B and 152B so that the laser light sources 151B and 152B enter the on state and controls the other laser light sources so that the other laser light sources enter the off state.

Figure 14:
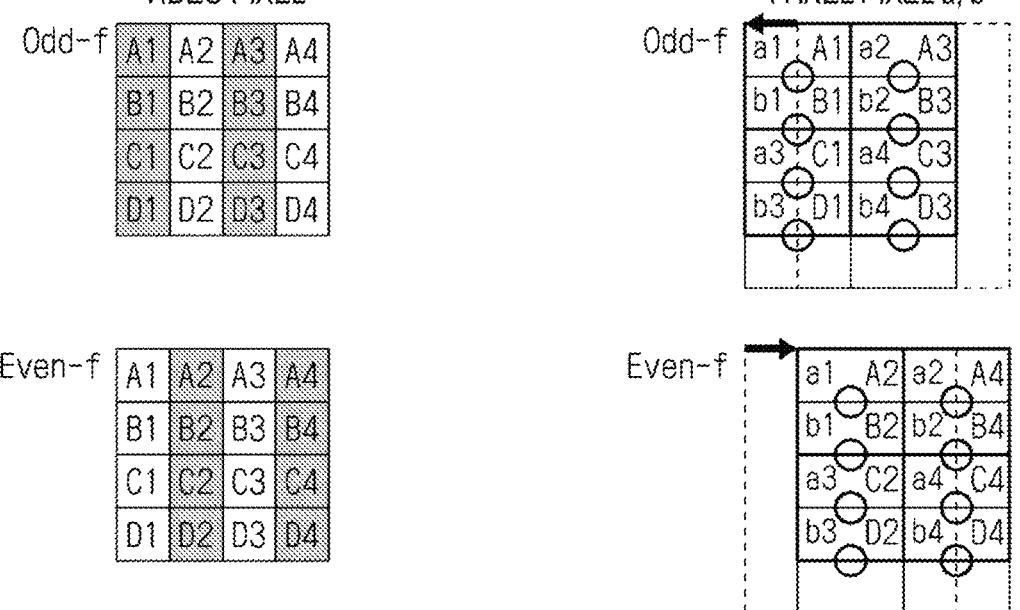
FIG. 14 is a diagram illustrating a relationship between video pixels, panel pixels, and projection positions in one frame period.

FIG. 14 is a diagram illustrating which video pixels and at which projection positions the panel pixels a and b represent in the second embodiment. In detail, FIG. 14 is a diagram illustrating at what projection positions the four panel pixels a1 to a4 on the upper left side of FIG. 12 and the four panel pixels b1 to b4 on the upper right side of FIG. 12 represent the video pixels illustrated in FIG. 3 in in the odd-numbered field period (Odd-f) and the even-numbered field period (Even-f).

As illustrated in FIG. 14, in the odd-numbered field period (Odd-f), the panel pixels a1 to a4 represent the R, G, and B components of the hatched video pixels A1, A3, C1, and C3 in the odd-numbered row and the odd-numbered column in order in the unit periods (OfC-R, OfC-G, and OfC-B).

Furthermore, in the odd-numbered field period (Odd-f), the panel pixels b1 to b4 represent the R, G, and B components of the hatched video pixels B1, B3, D1, and D3 in the even-numbered row and the odd-numbered column in order in the unit periods (OfC-R, OfC-G, and OfC-B).

An arrow pointing in a left direction in the panel pixels in the odd-numbered field period (Odd-f) indicates a shift direction from the projection position in the immediately preceding even-numbered field period (Even-f).

The processing circuit 21 controls the laser light sources 151R and 152R so that the laser light sources 151R and 152R enter the on state in the unit period (OfC-R) of the odd-numbered field period (Odd-f). Therefore, in the unit period (OfC-R), the R components of the video pixels A1, A3, C1, C3, B1, B3, D1, and D3 represented by the panel pixels a1 to a4 and b1 to b4 are visually recognized by the user. Next, the processing circuit 21 controls the laser light sources 151G and 152G so that the laser light sources 151G and 152G enter the on state in the unit period (OfC-G) of the odd-numbered field period (Odd-f). Therefore, in the unit period (OfC-G), the G components of the video pixels A1, A3, C1, C3, B1, B3, D1, and D3 represented by the panel pixels a1 to a4 and b1 to b4 are represented and visually recognized by the user.

The processing circuit 21 controls the laser light sources 151B and 152B so that the laser light sources 151B and 152B enter the on state in the unit period (OfC-B). Accordingly, the B components of the video pixels A1, A3, C1, C3, B1, B3, D1, and D3 represented by the panel pixels a1 to a4 and b1 to b4 are represented and visually recognized by the user.

Thus, in the odd-numbered field period (Odd-f), the RGB components of the video pixels in the odd-numbered columns among the video pixels are represented in color sequence, and as a result, the user visually recognizes the image in color.

When the odd-numbered field period (Odd-f) ends, the even-numbered field period (Even-f) arrives. The processing circuit 21 controls the light path shift element 190 so that the projection position is shifted in a right direction in the figure by 0.5 pixels of the panel pixel from the reference position.

In the unit periods (EfC-R, EfC-G, EfC-B) of the even-numbered field period (Even-f), the panel pixels a1 to a4 represent the R, G, and B components of the hatched video pixels A2, A4, C2, and C4 in the odd-numbered rows and the even-numbered columns in order.

Further, in the unit periods (EfC-R, EfC-G, EfC-B), the panel pixels b1 to b4 represent the R, G, and B components of the hatched video pixels B2, B4, D2, and D4 in the even-numbered rows and the even-numbered columns in order.

An arrow pointing to the right direction in the panel pixels in the even-numbered field period (Even-f) indicates a shift direction from the projection position in the immediately preceding odd-numbered field period (Odd-f).

The processing circuit 21 controls the laser light sources 151R and 152R so that the laser light sources 151R and 152R enter the on state in the unit period (EfC-R) of the even-numbered field period (Even-f). Accordingly, the R components of the video pixels A2, A4, C2, C4, B2, B4, D2, and D4 represented by the panel pixels a1 to a4 and b1 to b4 are visually recognized by the user.

Next, the processing circuit 21 controls the laser light sources 151G and 152G so that the laser light sources 151G and 152G enter the on state in the unit period (EfC-G). Accordingly, the G components of the video pixels A2, A4, C2, C4, B2, B4, D2, and D4 represented by the panel pixels a1 to a4 and b1 to b4 are visually recognized by the user.

The processing circuit 21 controls the laser light sources 151B and 152B so that the laser light sources 151B and 152B enter the on state in the unit period (EfC-B). Accordingly, the user visually recognizes the B components of the video pixels A2, A4, C2, C4, B2, B4, D2, and D4 represented by the panel pixels a1 to a4 and b1 to b4.

Thus, in the even-numbered field period (Even-f), the RGB components of the video pixels in the even-numbered columns are represented in color sequence, and as a result, the image is visually recognized in color by the user.

Therefore, when viewed throughout the odd-numbered field period (Odd-f) and the even-numbered field period (Even-f), the video pixels arranged in (2m) rows by (2n) columns are visually recognized in color by the user due to the combination image and shift of the liquid crystal panels 100a and 100b.

According to the second embodiment, it is possible to cause the user to visually recognize a color image with a resolution four times higher than that of the liquid crystal panels 100a and 100b using a configuration in which the liquid crystal panels 100a and 100b are shifted by 0.5 pixels of the panel pixel, as in the first embodiment.

In other words, in the present embodiment, since the liquid crystal panels 100a and 100b having a resolution that is ¼ of the resolution of the image to be visually recognized are sufficient, it is possible to construct the device at a lower cost than a case where liquid crystal panels having the same resolution as a projected image are used.

In the first embodiment and the second embodiment, since color video pixels are represented in color sequence, it is easy for color cracking to be visually recognized. The color cracking is also called color break-up.

Since it is easy for the color cracking to be visually recognized at a timing of color switching, it is said that the visual recognition of color cracking can be curbed by shortening a color switching interval or reducing the number of times colors are switched per unit time.

In the first or second embodiment, the unit period given to represent each component of the three primary colors is 2.78 milliseconds. It is difficult to drive a general liquid crystal panel in a period shorter than the unit period, that is, to drive the liquid crystal panel at a frequency higher than a frequency corresponding to a length of the period.

On the other hand, at least three primary colors are required in order for a user (human) to perceive color.

Therefore, at least three unit periods are required for one panel as a period for perceiving color (the field period in the embodiment).

In the first embodiment or the second embodiment, the field period is divided into the three unit periods, but the number of panels is "2". Using this point, a third embodiment in which the visual recognition of the color cracking is degraded will be described.

The third embodiment differs from the first embodiment in order of colors represented in the three unit periods, an operation of the liquid crystal panel 100b, and an operation of the light source 152. Therefore, these differences will be mainly described hereinafter.

Figure 15:
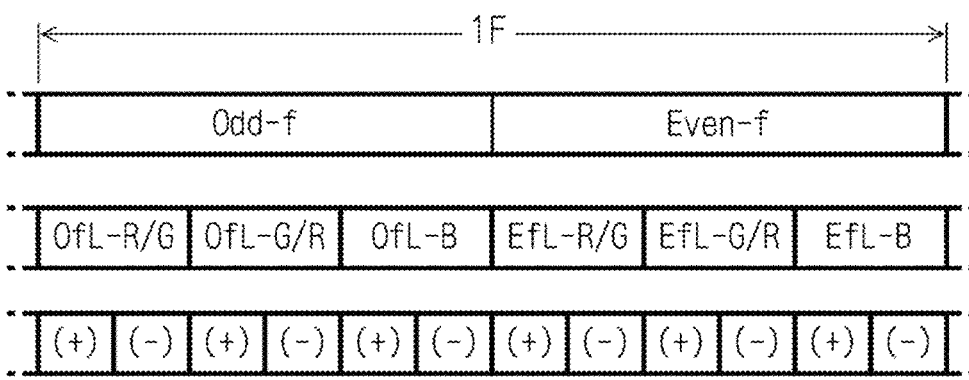
FIG. 15 is a diagram illustrating an operation in one frame period of a projection display device according to a third embodiment.
Figure 15:
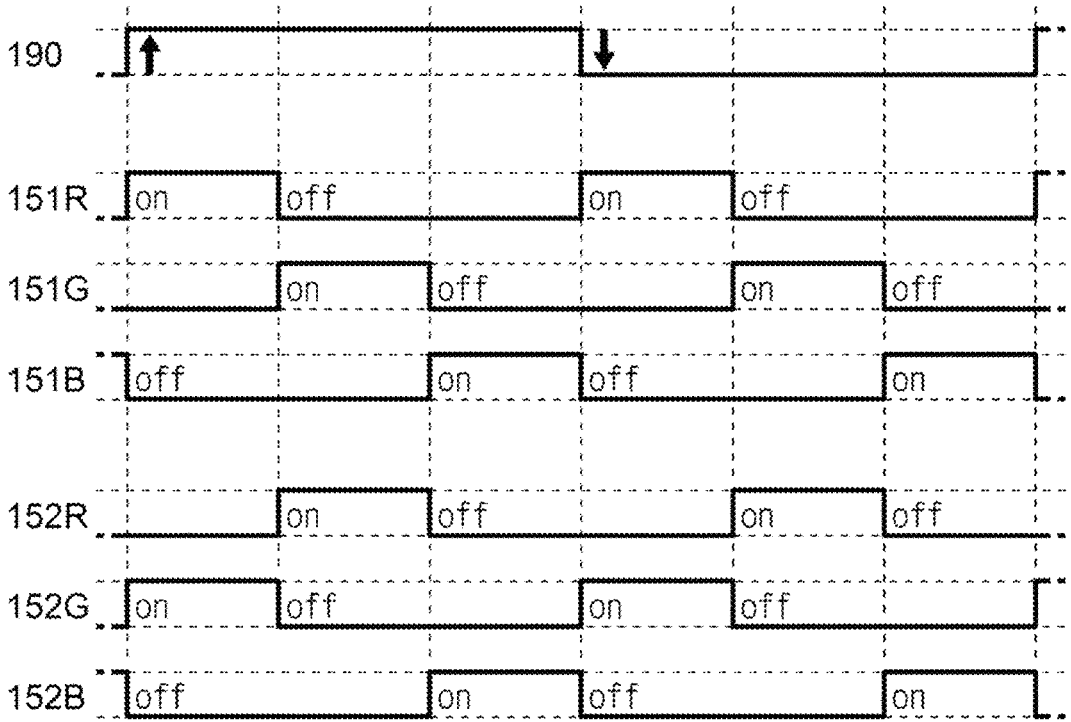

FIG. 15 is a diagram illustrating an operation of the projection display device 1 according to the third embodiment. In the third embodiment, among the three unit periods into which the odd-numbered field period (Odd-f) is divided, a first unit period is a unit period (OfL-R/G) and a second unit period is a unit period (OfL-G/R). A third unit period in the odd-numbered field period (Odd-f) is the unit period (OfL-B).

Further, among the three unit periods into which the even-numbered field period (Even-f) is divided, the first unit period is a unit period (EfL-R/G) and the second unit period is a unit period (EfL-G/R). The third unit period in the even-numbered field period (Even-f) is a unit period (EfL-B).

The unit period (OfL-R/G) is a period in which the panel pixel a of the liquid crystal panel 100a represents the R component of the video pixel in the odd-numbered row and the odd-numbered column, and a period in which the panel pixel b of the liquid crystal panel 100b represents the G component of the video pixel in the odd-numbered row and the even-numbered column.

The unit period (OfL-G/R) is a period in which the panel pixel a represents the G component of the video pixel in the odd-numbered row and the odd-numbered column, and the panel pixel b represents the R component of the video pixel in the odd-numbered row and the even-numbered column.

The unit period (OfL-B) is a period in which the panel pixel a represents the B component of the video pixel in the odd-numbered row and the odd-numbered column, and the panel pixel b represents the B component of the video pixel in the odd-numbered row and the even-numbered column.

The unit period (EfL-R/G) is a period in which the panel pixel a represents the R component of the video pixel in the even-numbered row and the odd-numbered column, and the panel pixel b represents the G component of the video pixel in the even-numbered row and the even-numbered column.

The unit period (EfL-G/R) is a period in which the panel pixel a represents the G component of the video pixel in the even-numbered row and the odd-numbered column, and the panel pixel b represents the R component of the video pixel in the even-numbered row and the even-numbered column.

The unit period (EfL-B) is a period in which the panel pixel a represents the B component of the video pixel in the even-numbered row and the odd-numbered column, and the panel pixel b represents the B component of the video pixel in the even-numbered row and the even-numbered column.

Further, in the third embodiment, the processing circuit 21 controls the light source 151 as in the first embodiment, but controls the light source 152 as follows unlike the first embodiment. In detail, in each of the unit periods in the odd-numbered field period (Odd-f) and the even-numbered field period (Even-f), the processing circuit 21 controls the laser light sources 151R, 151G, and 151B of the light source 151 so that the laser light sources enter the on state in order, but controls the laser light sources 151G, 151R, and 151B of the light source 152 so that the laser light sources enter the on state in order.

Thus, in the third embodiment, the time order of the unit period (OfL-R) and the unit (OfL-G) is swapped for the liquid crystal panel 100b of the first embodiment, and the time order of the unit period (EfL-R) and the unit period (EfL-G) is swapped.

In the third embodiment, in the unit period (OfL-R/G), the liquid crystal panel 100a represents the R component, the liquid crystal panel 100b represents the G component, and the laser light sources 151R and 152G enter the on state.

Therefore, the R component of the video pixel represented by the panel pixel a and the G component of the video pixel represented by the panel pixel b are combined, and a Y (yellow) component is visually recognized by the user.

In the unit period (OfL-G/R), since the liquid crystal panel 100a represents the G component, and the liquid crystal panel 100b represents the R component, the Y component resulting from the combination of the two components is similarly visually recognized by the user.

To this end, in the third embodiment, in the three unit periods (OfL-R/G, OfL-G/R, and OfL-B) of the odd-numbered field period (Odd-f), the colors are switched in order of Y-Y-B when viewed in combination, and in the three unit periods (EfL-R/G, EfL-G/R, and EfL-B) of the even-numbered field period (Even-f), the colors are similarly switched in order of Y-Y-B.

Therefore, according to the third embodiment, since the number of times the colors are switched is reduced in each field period compared to the first embodiment in which the colors are switched in order of R-G-B, the visual recognition of the color cracking can be degraded.

In the third embodiment, the time order of the unit period (OfL-R) and the unit period (OfL-G) of the liquid crystal panel 100b in the first embodiment is swapped, and the time order of the unit period (EfL-R) and the unit period (EfL-G) is swapped, but the present disclosure is not limited thereto.

Figure 16:
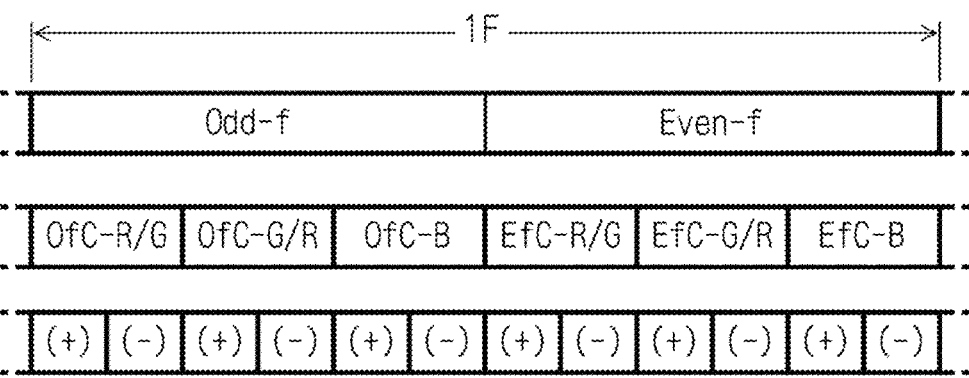
FIG. 16 is a diagram illustrating an operation in one frame period of a projection display device according to another example of the third embodiment.
Figure 16:
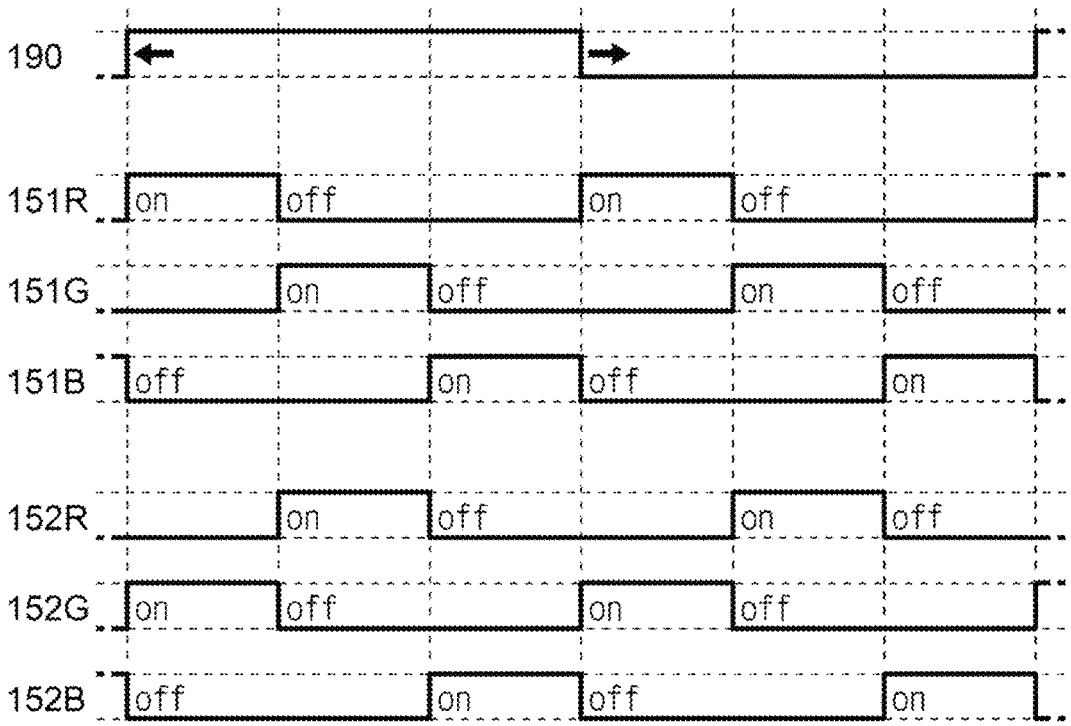

For example, as illustrated in FIG. 16, the time order of the unit period (OfC-R) and the unit period (OfC-G) of the liquid crystal panel 100b in the second embodiment may be swapped, and the time order of the unit period (EfC-R) and the unit period (EfC-G) may be swapped. In detail, in the second embodiment, among the three unit periods in the odd-numbered field period (Odd-f), a first unit period is a unit period (OfC-R/G), a second unit period is a unit period (OfC-G/R), and a third unit period is the unit period (OfC-B). Further, among the three unit periods in the even-numbered field period (Even-f), a first unit period is a unit period (EfC-R/G), a second unit period is a unit period (EfC-G/R), and a third unit period is the unit period (EfC-B).

The unit period (OfC-R/G) is a period in which the panel pixel a of the liquid crystal panel 100a represents the R component of the video pixel in the odd-numbered row and the odd-numbered column, and the panel pixel b of the liquid crystal panel 100b represents the G component of the video pixel in the even-numbered row and the odd-numbered column. The unit period (OfC-G/R) is a period in which the panel pixel a represents the G component of the video pixel in the odd-numbered row and the odd-numbered column, and the panel pixel b represents the R component of the video pixel in the even-numbered row and the odd-numbered column.

The unit period (OfC-B) is a period in which the panel pixel a represents the B component of the video pixel in the odd-numbered row and the odd-numbered column, and the panel pixel b represents the B component of the video pixel in the even-numbered row and the odd-numbered column.

The unit period (EfC-R/G) is a period in which the panel pixel a represents the R component of the video pixel in the odd-numbered row and the even-numbered column, and the panel pixel b represents the G component of the video pixel in the even-numbered row and the even-numbered column. The unit period (EfC-G/R) is a period in which the panel pixel a represents the G component of the video pixel in the odd-numbered row and the even-numbered column, and the panel pixel b represents the R component of the video pixel in the even-numbered row and the even-numbered column.

The unit period (EfC-B) is a period in which the panel pixel a represents the B component of the video pixel in the odd-numbered row and the even-numbered column, and the panel pixel b represents the B component of the video pixel in the even-numbered row and the even-numbered column.

Further, in the third embodiment, the panel pixel a represents the R component and the panel pixel b represents the G component in the unit period (OfL-R/G) or the unit period (OfC-R/G), the panel pixel a represents the G component and the panel pixel b represents the R component, and these are combined to produce the Y component in the unit period (OfL-G/R) or the unit period (OfC-G/R), and the B component is represented in the remaining period, but the present disclosure is not limited to this configuration.

For example, in one of the three periods in the field period, the G component may be represented on one side of the panel pixel and the B component on the other side, the B component may be represented on one side of the panel pixel and the G component on the other side in the other period, the R component may be represented in the remaining period, and switching may be performed in order of C (cyan)-C-R.

Further, in one of the three periods in the field period, the R component may be represented on one side of the panel pixel and the B component may be represented on the other side, the B component may be represented on one side of the panel pixel and the R component may be represented on the other side in the other period, the G component may be represented in the remaining period, and switching may be performed in order of M (magenta)-M-G.

The transmission image from the liquid crystal panel 100a is an example of a first image light, the light source 151 is an example of a first light source, the R component is an example of a light component of a first color, the G component is an example of a light component of a second color, the B component is an example of a light component of a third color, the P-polarized light is an example of first polarized light, and the optical polarization system 160a is an example of a first polarization conversion member. That is, a device including the light source 151, the optical polarization system 160a, and the liquid crystal panel 100a is an example of a first image light emission device.

Further, the transmission image from the liquid crystal panel 100b is an example of second image light, the light source 152 is an example of a second light source, the S-polarized light is an example of second polarized light, and the optical polarization system 160b is an example of a second polarization conversion member. That is, a device including the light source 152, the optical polarization system 160b, and the liquid crystal panel 100b is an example of a second image light emission device.

The right direction is an example of a first direction, and the downward direction is an example of a second direction. The prism 180 is an example of an optical combination system.

In the first to third embodiments described above (hereinafter referred to as an "embodiment and the like"), various modifications or applications are possible as follows.

In the embodiment and the like, the liquid crystal panels 100*a* and 100*b* as the image light emission devices are of the transmissive type, but the liquid crystal panels 100*a* and 100*b* may also be of a reflective type.

Further, in the embodiment and the like, the liquid crystal panels 100*a* and 100*b* are configured to display colors in a color sequence, but one panel pixel may be divided into RGB subpixels, and colors may be displayed by the three subpixels, for example. In this configuration, since one panel pixel has the RGB subpixels, it is possible to represent colors without the color sequence, that is, without dividing one field period into three unit periods.

Further, the image light emission device is not limited to the liquid crystal panel 100, and a self-emitting display panel may be used. The self-emitting panel is a display panel that generates an image by emitting light from its own display elements, without using a light source like the liquid crystal panel 100. In the self-emitting panel, an organic light emitting diode (OLED), a micro light emitting diode (LED), or the like may be used as the display element.

Figure 17:
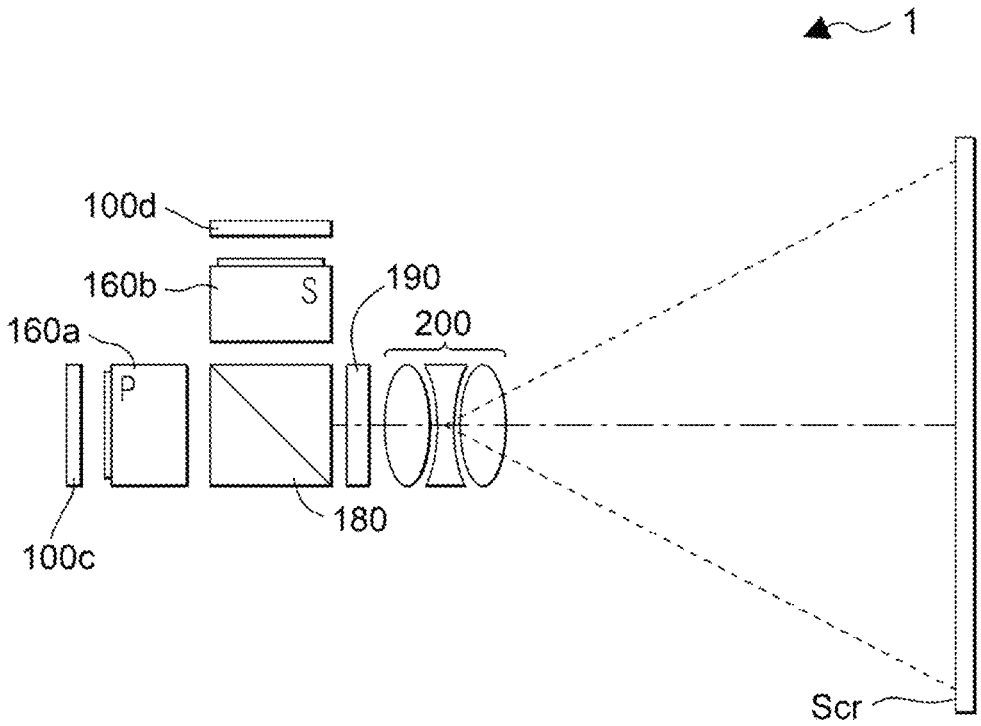
FIG. 17 is a diagram illustrating a projection display device according to an application example.

FIG. 17 is a diagram illustrating a configuration in which self-emitting panels 100*c* and 100*d* are applied as a projection display device according to a modification example.

In this modification example, in the self-emitting panels 100*c* and 100*d*, OLEDs are used as display elements. Both the self-emitting panels 100*c* and 100*d* have RGB subpixels, and constitute one panel pixel using the RGB subpixels to represent color.

In this modification example, an arrangement of panel pixels in the self-emitting panel 100*c* and an arrangement of panel pixels in the self-emitting panel 100*d* are shifted by 0.5 pixels of the panel pixel in a horizontal direction (row direction), as in the embodiment and the like.

Further, since the self-emitting panels have the RGB sub-pixels, it is possible to represent the color without dividing one field period into three unit periods, as described above.

Light emitted by the OLED is random light that is not polarized. To this end, the optical polarization system 160*a* is provided between the self-emitting panel 100*c* and the prism 180, and the optical polarization system 160*b* is provided between the self-emitting panel 100*d* and the prism 180.

Further, the present disclosure can be applied to, for example, a mirror element in which an inclination of a mirror has a position corresponding to on or off and reflects incident light in a predetermined direction only in any one of an on or off state, as the image light emission device.

The following aspects, for example, can be ascertained from the above-described embodiments.

A projection display device according to aspect 1 includes a first image light emission device configured to emit first image light, a second image light emission device configured to emit second image light, an optical combination system configured to combine the first image light with the second image light in a state in which the second image light is shifted in a first direction relative to the first image light, and emit combination light, a light path shift element configured to shift a light path for the combination light emitted from the optical combination system, and a display control circuit configured to control the first image light emission device, the second image light emission device, and the light path shift element, wherein one frame period includes a first field period and a second field period, the display control circuit supplies a data signal of a video pixel aligned in the first direction at an odd-numbered position in a second direction intersecting the first direction in video pixel data among data signals corresponding to gradation levels designated by the video pixel data arranged in a matrix to the first image light emission device, supplies a data signal of the video pixel aligned in the first direction at an even-numbered position in the second direction in the video pixel data to the second image light emission device, and controls the light path shift element so that the light path is set as a reference position in the first field period, and supplies a data signal of the video pixel aligned in the first direction at an even-numbered position in the second direction in the video pixel data to the first image light emission device, supplies a data signal of the video pixel aligned in the first direction at an odd-numbered position in the second direction in the video pixel data to the second image light emission device, and controls the light path shift element so that the light path is shifted in the second direction intersecting the first direction in the second field period, and the first image light emission device emits the first image light based on the supplied data signal, and the second image light emission device emits the second image light based on the supplied data signal.

According to the projection display device according to aspect 1, it is possible to provide high-resolution projection at low cost.

In the projection display device according to specific aspect 2 of aspect 1, in the optical combination system, an amount of shift of the second image light in the first direction relative to the first image light is 0.5 pixels of the pixel in the first image light or the second image light, and an amount of shift of the light path in the light path shift element is the 0.5 pixels.

In the projection display device according to specific aspect 3 of aspect 2, the first image light emission device includes a first liquid crystal panel, a first light source configured to emit light toward the first liquid crystal panel, and a first polarization conversion member configured to convert the light emitted by the first light source into first polarized light, the first polarized light is incident on the first liquid crystal panel, the second image light emission device includes a second liquid crystal panel, a second light source configured to emit light toward the second liquid crystal panel, and a second polarization conversion member configured to convert the light emitted by the second light source into second polarized light, and the second polarized light is incident on the second liquid crystal panel.

In the projection display device according to specific aspect 4 of aspect 3, the first light source and the second light source are laser light sources that respectively emit first light including a wavelength range of red, second light including a wavelength range of green, and third light including a wavelength range of blue.

In the projection type display device according to another specific aspect 5 of aspect 3, the first liquid crystal panel in the first image light emission device generates images of light components of the first color, the second color, and the third color in positive polarity writing and negative polarity writing, and the second liquid crystal panel in the second image light emission device generates the images of the light components of the first color, the second color, and the third color in positive polarity writing and negative polarity writing.

In the projection type display device according to specific aspect 6 of aspect 5, when the first liquid crystal panel generates image light of the light component of the first color, the second liquid crystal panel generates image light of the light component of the second color, and when the first liquid crystal panel generates the image light of the light component of the second color, the second liquid crystal panel generates the image light of the light component of the first color.

In the projection type display device according to specific aspect 7 of any one of aspects 3 to 6, in the first field period and the second field period, the first image light emission device generates a light component of a first color, a light component of a second color, and a light component of a third color having different wavelengths in the first image light in a time-division manner, and the second image light emission device generates a light component of the first color, a light component of the second color, and a light component of the third color in the second image light in a time-division manner.

In the projection type display device according to specific aspect 8 of aspect 2, the first image light emission device includes a first self-emitting panel including sub-pixels corresponding to a first color, a second color, and a third color having different wavelengths, and configured to emit the first image light, and a first polarization conversion member configured to convert the light emitted from the first self-emitting panel into the first polarized light, and the second image light emission device includes a second self-emitting panel including sub-pixels of the first color, the second color, and the third color, and configured to emit the second image light, and a second polarization conversion member configured to convert the light emitted from the second self-emitting panel into the second polarized light.

What is claimed is:

1. A projection display device comprising:

a first image light emission device configured to emit first image light;

a second image light emission device configured to emit second image light;

an optical combination system configured to combine the first image light with the second image light in a state in which the second image light is shifted in a first direction relative to the first image light, and emit combination light, a light path shift element configured to shift a light path for the combination light emitted from the optical combination system; and a display control circuit configured to control the first image light emission device, the second image light emission device, and the light path shift element, wherein one frame period includes a first field period and a second field period, the display control circuit supplies a data signal of a video pixel aligned in the first direction at an odd-numbered position in a second direction intersecting the first direction in video pixel data among data signals corresponding to gradation levels designated by the video pixel data arranged in a matrix to the first image light emission device, supplies a data signal of the video pixel aligned in the first direction at an even-numbered position in the second direction in the video pixel data to the second image light emission device, and controls the light path shift element so that the light path is set as a reference position in the first field period, and supplies a data signal of the video pixel aligned in the first direction at an even-numbered position in the second direction in the video pixel data to the first image light emission device, supplies a data signal of the video pixel aligned in the first direction at an odd-numbered position in the second direction in the video pixel data to the second image light emission device, and controls the light path shift element so that the light path is shifted in the second direction intersecting the first direction in the second field period, and the first image light emission device emits the first image light based on the supplied data signal, and the second image light emission device emits the second image light based on the supplied data signal.

2. The projection display device according to claim 1, wherein in the optical combination system, an amount of shift of the second image light in the first direction relative to the first image light is 0.5 pixels of the pixel in the first image light or the second image light, and an amount of shift of the light path in the light path shift element is 0.5 pixels.

3. The projection display device according to claim 2, wherein the first image light emission device includes a first liquid crystal panel, a first light source configured to emit light toward the first liquid crystal panel, and a first polarization conversion member configured to convert the light emitted by the first light source into first polarized light, the first polarized light is incident on the first liquid crystal panel, the second image light emission device includes a second liquid crystal panel, a second light source configured to emit light toward the second liquid crystal panel, and a second polarization conversion member configured to convert the light emitted by the second light source into second polarized light, and the second polarized light is incident on the second liquid crystal panel.

4. The projection display device according to claim 3, wherein each of the first light source and the second light source is a laser light source that emits first light including a wavelength range of red, second light including a wavelength range of green, and third light including a wavelength range of blue.

5. The projection display device according to claim 3, wherein the first liquid crystal panel in the first image light emission device generates images of light components of a first color, a second color, and a third color in positive polarity writing and negative polarity writing, and the second liquid crystal panel in the second image light emission device generates the images of the light components of the first color, the second color, and the third color in positive polarity writing and negative polarity writing.

6. The projection display device according to claim 5, wherein when the first liquid crystal panel generates image light of the light component of the first color, the second liquid crystal panel generates image light of the light component of the second color, and when the first liquid crystal panel generates the image light of the light component of the second color, the second liquid crystal panel generates the image light of the light component of the first color.

7. The projection display device according to claim 3, wherein in the first field period and the second field period, the first image light emission device generates a light component of a first color, a light component of a second color, and a light component of a third color having different wavelengths in the first image light in a time-division manner, and the second image light emission device generates a light component of the first color, a light component of the second color, and a light component of the third color in the second image light in a time-division manner.

8. The projection display device according to claim 2, wherein the first image light emission device includes a first self-emitting panel including sub-pixels corresponding to a first color, a second color, and a third color having different wavelengths, and configured to emit the first image light; and a first polarization conversion member configured to convert the light emitted from the first self-emitting panel into the first polarized light, and the second image light emission device includes a second self-emitting panel including sub-pixels of the first color, the second color, and the third color, and configured to emit the second image light; and a second polarization conversion member configured to convert the light emitted from the second self-emitting panel into the second polarized light.

* * * * *